US010437970B2

(12) United States Patent
Holz et al.

(10) Patent No.: US 10,437,970 B2
(45) Date of Patent: Oct. 8, 2019

(54) USER AUTHENTICATION AND DATA ENCRYPTION

(71) Applicant: EXCALIBUR IP, LLC, New York, NY (US)

(72) Inventors: Christian Holz, San Francisco, CA (US); Marius Knaust, Brandenburg (DE); Rajiv Ayyangar, San Francisco, CA (US); Senaka Buthpitiya, Mountain View, CA (US); Haojian Jin, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 56 days.

(21) Appl. No.: 15/790,015

(22) Filed: Oct. 22, 2017

(65) Prior Publication Data
US 2018/0060547 A1    Mar. 1, 2018

Related U.S. Application Data

(62) Division of application No. 14/568,956, filed on Dec. 12, 2014, now Pat. No. 9,817,956.

(51) Int. Cl.
*G06F 21/31* (2013.01)
*G06F 21/32* (2013.01)
*G06F 21/62* (2013.01)

(52) U.S. Cl.
CPC .............. *G06F 21/31* (2013.01); *G06F 21/32* (2013.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 5,495,533 A * | 2/1996 | Linehan | ................. | G06F 21/31 380/277 |
| 6,122,737 A * | 9/2000 | Bjorn | ..................... | G06F 21/10 713/186 |
| 6,522,417 B1* | 2/2003 | Kakigahara | ........... | G06F 1/1626 358/1.15 |
| 8,838,989 B2* | 9/2014 | Adams | ............... | G07C 9/00087 713/186 |
| 9,148,894 B1* | 9/2015 | Pan | ........................ | H04W 4/14 |
| 9,338,165 B2* | 5/2016 | Simpkins | ............ | H04L 63/0281 |
| 10,115,105 B2* | 10/2018 | Viswanath | ......... | G06Q 20/4014 |
| 2001/0013096 A1* | 8/2001 | Luckenbaugh | ... | G06F 17/30861 713/154 |
| 2001/0042124 A1* | 11/2001 | Barron | ................ | G06F 12/1408 709/227 |
| 2002/0122553 A1* | 9/2002 | Kao | ...................... | H04L 9/0891 380/28 |

(Continued)

*Primary Examiner* — Piotr Poltorak
(74) *Attorney, Agent, or Firm* — James J. DeCarlo; Greenberg Traurig, LLP

(57) ABSTRACT

A user is authenticated based on feature data of a target such as a body-part or other object obtained by a touchscreen of a computing device. When the user positions the target to interact with the touchscreen, interaction data is gathered. Feature data of the target is determined from the gathered interaction data. The feature data is used to identify one or more of the target and the user. Various actions are executed based on the identification and authentication of the user.

4 Claims, 17 Drawing Sheets

(56) References Cited

U.S. PATENT DOCUMENTS

| | | | | |
|---|---|---|---|---|
| 2002/0162021 A1* | 10/2002 | Audebert | G06Q 20/3672 | 726/4 |
| 2007/0233875 A1* | 10/2007 | Raghav | G06Q 10/107 | 709/227 |
| 2007/0250924 A1* | 10/2007 | Ono | G06F 21/6218 | 726/19 |
| 2008/0046983 A1* | 2/2008 | Lester | G06F 21/31 | 726/5 |
| 2009/0153341 A1* | 6/2009 | Spalink | G06F 1/1626 | 340/669 |
| 2010/0167715 A1* | 7/2010 | Domene | H04M 1/274525 | 455/418 |
| 2010/0257251 A1* | 10/2010 | Mooring | H04W 4/21 | 709/216 |
| 2011/0054838 A1* | 3/2011 | Rottler | G01C 22/006 | 702/160 |
| 2011/0076941 A1* | 3/2011 | Taveau | G06Q 10/10 | 455/41.1 |
| 2011/0191272 A1* | 8/2011 | McGuire | G06N 5/00 | 706/11 |
| 2011/0310044 A1* | 12/2011 | Higuchi | G06F 1/1684 | 345/173 |
| 2012/0265685 A1* | 10/2012 | Brudnicki | G06Q 30/06 | 705/44 |
| 2013/0187850 A1* | 7/2013 | Schulz | G06F 3/03 | 345/156 |
| 2013/0227418 A1* | 8/2013 | Sa | G06F 3/0488 | 715/728 |
| 2014/0270415 A1* | 9/2014 | Alameh | G06K 9/00026 | 382/124 |
| 2014/0310804 A1* | 10/2014 | Apostolos | H04L 63/0861 | 726/19 |
| 2014/0337243 A1* | 11/2014 | Dutt | G06Q 50/265 | 705/325 |
| 2015/0117646 A1* | 4/2015 | Best | H04W 12/08 | 380/270 |
| 2017/0017961 A1* | 1/2017 | Kim | G06Q 20/10 | |
| 2019/0037254 A1* | 1/2019 | Fennelly | H04N 21/23424 | |

* cited by examiner

USER AUTHENTICATION AND DATA ENCRYPTION

CROSS REFERENCES TO RELATED APPLICATIONS

This application is a divisional application of U.S. Non-Provisional application Ser. No. 14/568,956, filed on Dec. 12, 2014, entitled "USER AUTHENTICATION AND DATA ENCRYPTION," the entirety of which is incorporated herein by reference.

BACKGROUND

The improvements in miniaturization of memory hardware and data compression software have enabled portable computing devices to be used for storage and transport of data. In fact, personal devices like laptops, smartphones and tablets are used to store sensitive user data such as documents, photos, videos, personal communications, passwords, private notes and other confidential data. As mobile devices are constant companions to many users, they are vulnerable to loss and theft. A finder has immediate access to the personal information and could even impersonate the owner. To protect data, personal computing devices employ screen locks such as PIN numbers or patterns which prevent unauthorized use of the personal computing device.

SUMMARY

This disclosure relates to systems and methods for user authentication and data encryption. A processor-executable method for authentication of a user interaction is disclosed in some embodiments. The method comprises sensing, by the processor, a target of at least one user interacting with a touchscreen of a mobile device and receiving, by a processor via the touchscreen, interaction data of the target to authorize the user for executing a function with the mobile device. The interaction data can comprise raw sensor data in some embodiments. The processor extracts key frames from the received interaction data and determines feature data of the target from the extracted key frames. The method further comprises comparing, by the processor, the feature data of the target with pre-stored user information and identifying by the processor upon the comparison, the user based on a match between the feature data and at least a portion of the pre-stored user information. The processor authorizes the user for the function if the user is identified based on the match and blocks the user from executing the function if there is no match between the feature data and at least a portion of the pre-stored user information.

In some embodiments, authorizing the user for the function further comprises unlocking, by the processor, a vault comprising a strong key and providing, by the processor, the strong key to the user for executing the function. In some embodiments, authorizing the user for the function further comprises automatically executing, by the processor, the function upon the user being identified based on the match.

In some embodiments, the target is the user's body-part and the user information comprises models of the biometric information of body parts of a plurality of users authorized to use the mobile device. The processor generates the model based on the feature data of the target and trains the model on multiple samples of the feature data. The processor further stores the trained model for future authentication. The body-parts used as a target can comprise an ear, a fist, a palm, one or more fingers and a facial feature of the user.

In some embodiments, the function can comprise one of answering an incoming phone call and opening a document encrypted using the biometric data of the user's body part.

In some embodiments, wherein the at least one user comprises a plurality of users and the function comprises opening an encrypted document and the authenticating method further comprises receiving, by the processor, via the touchscreen, interaction data of each of the plurality of user's target and comparing, by the processor, the feature data of each user's target with respective pre-stored authentication information. The processor identifies the each of the plurality of users based on the comparison and authorizes access to or opening of the document if the plurality of users' identification matches respective pre-stored authentication information authorized for the opening the document. In some embodiments, the processor denies the users from the interaction if the at least one user's identification does not match the respective pre-stored authentication information.

In some embodiments, the method of extracting key frames by the processor further comprises, extracting, by the processor, a plurality of frames of capacitive information of the target during the interaction with the touchscreen and determining, intensities for the plurality of frames. A frame with highest intensity is identified by the processor from the extracted plurality of frames. The plurality of frames are sorted into a plurality of bins based on their respective intensities and respective key frames are formed by the processor for each of the plurality of bins. Key frames of different scaling types are created by applying different mappings to the bin frames. For example, exponential, logarithmic and linear type of mappings can be applied to a bin-frame to create three key frames of three different scaling types. A plurality of models are accessed by the processor for each target, each of the plurality of models processes key frames from a respective one of the plurality of bins. In some embodiments, determining the target associated with the received interaction data further comprises identifying, by the processor, a model of a respective scaling type from the plurality of models of different sealing types for each target that best matches key frames of a respective one of the plurality of bins and selecting, by the processor, one of the plurality of models based on a voting procedure. In some embodiments, identifying the user further comprises identifying by the processor a subset of the user models that correspond to the determined target and one of the subset of the user models is selected as identifying the user.

An apparatus comprising a processor and a non-transitory processor readable storage medium having stored thereon programming logic is disclosed in one embodiment. The programming logic comprises sensing logic, executed by the processor, for sensing a target of at least one user interacting with a touchscreen of a mobile device and receiving logic, executed by the processor for receiving via the touchscreen, interaction data of the target to authorize the user for executing a function with the mobile device. Extracting logic is executed by the processor, for extracting key frames from the received interaction data. The processor executes feature determining logic to determine feature data of the target and target determining logic for determining the target associated with the feature data. Comparing logic, is executed by the processor, for comparing the feature data of the target with pre-stored user information. User identifying logic, is executed by the processor, for identifying the user based on a match between the received feature data and at least a portion of the pre-stored user information. The processor authorizes the user for the function if the user is identified via executing authorizing logic, and blocks the user from executing the function if there is no match between the received feature data and at least a portion of the pre-stored user information by executing blocking logic.

In some embodiments, the authorizing logic executed by the processor, further comprises unlocking logic, for unlocking a vault comprising a strong key and providing logic for providing the strong key to the user for executing the function. In some embodiments, the authorizing logic further comprises logic for automatically executing, by the processor, the function upon the user being identified based on the match.

In some embodiments, the target is the user's body-part and the user information comprises biometric information of body parts of a plurality of users authorized to use the mobile device. In some embodiments, the at least one user comprises two users and the function comprises opening an encrypted document.

In some embodiments, the programming logic further comprises, logic for determining via the touchscreen, feature data of respective target of each user of a plurality of users, logic for comparing the feature data of each user's target with respective pre-stored authentication information, logic for identifying each user based on the comparison, logic for authorizing opening of the document if the identification of the plurality of users matches respective pre-stored authentication information authorized for the opening the document and logic executed by the processor for denying the users from the interaction if at least one user's identification does not match the respective pre-stored authentication information.

In some embodiments, the extracting logic further comprises logic executed by the processor for extracting a plurality of frames of capacitive information of the target during the interaction with the touchscreen, determining intensities for the plurality of frames, identifying a frame with highest intensity from the extracted plurality of frames, sorting the plurality of frames into a plurality of bins based on their respective intensities and for forming respective key frames for each of the plurality of bins. In some embodiments, the programming logic further comprises accessing logic, executed by the processor, for accessing a plurality of models of different scaling types for each target, each of the plurality of models processes a key frame of a respective scaling type from a respective one of the plurality of bins. For example, three models corresponding to the linear, exponential and logarithmic scaling types can each be matched to key frames of respective scaling type.

In some embodiments, the determining logic further comprises, logic executed by the processor for identifying a model from the plurality of models of each target that best matches key frames of a respective type from a respective one of the plurality of bins and logic executed by the processor for selecting one of the plurality of models based on a voting procedure. In some embodiments, the identifying logic further comprises accessing logic, executed by the processor, for accessing the user information comprising the plurality of models representing respective feature data associated with targets of a plurality of users, model identifying logic, executed by the processor, for identifying a subset of the models that correspond to the determined target and model selecting logic, executed by the processor, for selecting one of the subset of the models as identifying the user.

A computer readable storage medium comprising processor-executable instructions is disclosed in an embodiment. The processor-executable instructions include instructions for sensing a target of at least one user interacting with a touchscreen of a mobile device, receiving via the touchscreen, interaction data of the target to authorize the user for executing a function with the mobile device and extracting key frames from the received interaction data. The instructions further comprise instructions for determining feature data of the target from the extracted key frames. The instructions further comprise instructions to determine the target associated with the received interaction data from the extracted key frames, comparing the feature data of the target with pre-stored user information and identifying upon the comparison, the user based on a match between the feature data and at least a portion of the pre-stored user information. The instructions also include instructions for authorizing the user for the function if the user is identified based the match and blocking the user from executing the function if there is no match between the feature data and at least a portion of the pre-stored user information.

A method of enabling access to encrypted data is disclosed in an embodiment. The method comprises receiving, by a processor at a device comprising a touchscreen, a document encrypted with feature data of at least one target. When a request to open the document is received by the processor, sensed feature data of a first target interacting with the touchscreen is obtained by the processor via the touchscreen. The feature data of the first target is transmitted to an application for opening the document wherein the processor employs the feature data of the first target to decrypt the document. In some embodiments, the first target is a body-part of a first user and the feature data of the first target comprises biometric information of the first user's body part. In some embodiments, the at least one target further comprises a plurality of targets in addition to the first target, the plurality of targets being respective body-parts of a plurality of users.

The method of enabling access to the encrypted data further comprises, obtaining, by the processor via the touchscreen, biometric information of the plurality of targets that interact with the touchscreen and providing, by the processor, the biometric information of the plurality of targets to an application for opening the document. The biometric information of the first target and the plurality of targets is employed by the processor for decrypting the document. In some embodiments, the first target and the plurality of targets interact with the touchscreen simultaneously. In some embodiments, the first target and the plurality of targets interact with the touchscreen sequentially.

An apparatus comprising a processor, a touchscreen and a processor-readable non-transitory storage medium comprising programming logic is disclosed in some embodiments. The programming logic comprises, document receiving logic, executed by a processor, for receiving a document encrypted with feature data of at least one target, request receiving logic, executed by a processor, for receiving a request to open the document. The programming logic also comprises obtaining logic, executed by a processor, for obtaining via the touchscreen, interaction data of a first target interacting with the touchscreen and determining logic for determining the feature data of the first target from the interaction data. Providing logic, is executed by a processor, for providing the feature data of the first target to an application for opening the document. Employing logic is executed by a processor, for employing the feature data of the first target to decrypt the document. In some embodiments, the apparatus also comprises logic for obtaining via the touchscreen, biometric information of the second target interacting with the touchscreen, logic for providing the biometric information of the second target to an application for opening the document and logic for employing the biometric information of the first target and the second target for decrypting the document.

A method of exchanging information securely is disclosed in some embodiments. The method comprises, receiving, by a processor comprised in a first computing device, user input to connect to a disparate second computing device via a communication network, connecting, by the processor, the first computing device with the second computing device through the communication network and determining, by the processor via a touchscreen of the first computing device, feature data of a target interacting with the touchscreen. The method further comprises determining, by the processor, based on the feature data of the target if an information exchange is authorized between the first computing device and the second computing device, receiving, by the processor, a user gesture for initiating the information exchange and exchanging, by the processor upon receiving the user gesture, the information if it is determined that the information exchange is authorized based on the feature data. In some embodiments, the target is a body-part of a user and the feature data of the target comprises biometric information of the user's body part.

In some embodiments, exchanging the information further comprises transmitting, by the processor to the second computing device, a document encrypted with the biometric information of the user's body part. In some embodiments, determining if an information exchange is authorized further comprises determining, by the processor, based on the biometric information of the user's body part if the information exchange is authorized and receiving, by the processor, a document from the second computing device.

An apparatus comprising a touchscreen, a processor and a processor-readable non-transitory storage medium comprising programming logic for secure data exchange is disclosed in some embodiments. The programming logic comprises input receiving logic, executed by the processor, for receiving user input to connect to a second computing device via a communication network, connecting logic, executed by the processor, for connecting with the second computing device through the communication network, feature determining logic, executed by the processor, for obtaining via the touchscreen, feature data of a target interacting with the touchscreen. The programming logic also comprises determining logic, executed by the processor, for determining based on the feature data of the target if an information exchange is authorized between the first computing device and the second computing device, gesture receiving logic, executed by the processor, for receiving a user gesture for initiating the information exchange and exchanging logic, executed by the processor, for exchanging upon receiving the user gesture, the information if it is determined that the information exchange is authorized based on the feature data. In some embodiment, exchanging logic further comprises transmitting logic, executed by the processor, for transmitting to the second computing device, a document encrypted with the biometric information of the user's body part.

A non-transitory computer readable storage medium, comprising processor-executable instructions for secure data exchange is disclosed in one embodiment. The medium comprises instructions for receiving user input to connect to a computing device via a communication network, connecting, to the computing device through the communication network and obtaining, via a touchscreen, interaction data of a target interacting with the touchscreen. The instructions also comprise instructions for determining, based on the interaction data of the target if an information exchange is authorized between the first computing device and the second computing device, receiving, a user gesture for initiating the information exchange and exchanging, upon receiving the user gesture, the information if it is determined that the information exchange is authorized based on the feature data.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
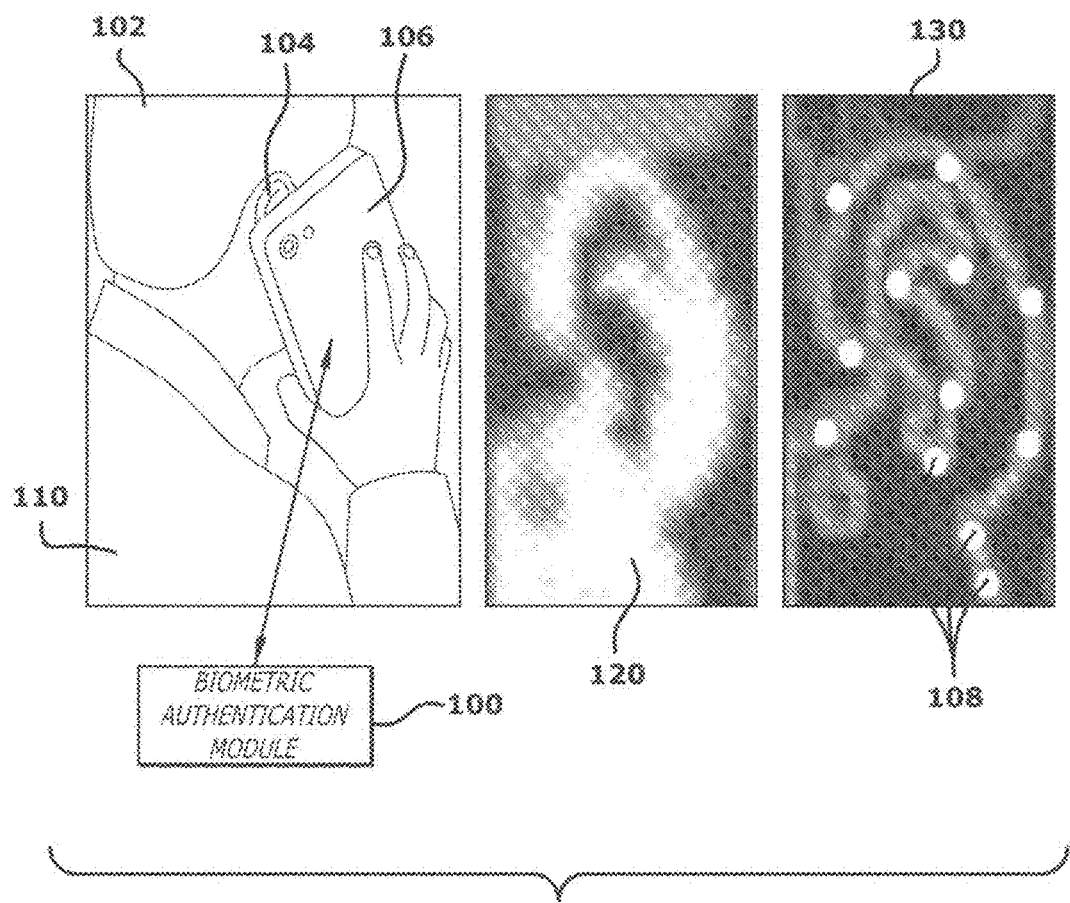
FIG. 1 is an illustration of a user employing a mobile device that comprises a biometric authentication module in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Mobile computing devices that are home to personal and confidential data are also vulnerable to theft and hacking. Users are therefore interested in secure storage and access of their data in addition to securing the devices. Many mobile computing devices enable users to secure their devices via schemes that include PIN (Personal Identification Number), patterns and passwords. Unfortunately, only a small percentage of users employ such modalities to protect their devices citing inconvenience as a common reason. While graphical passwords case memorization and PIN entry, they find only limited acceptance and are subject to eavesdropping. Various ways are being researched in order to address these problems. One methodology is to use cameras on computing devices to receive a user's biometric data. However, such techniques to optically receive biometric data are hampered by constraints such as field of view and orientation. A user has to hold the camera at a distance and at a specific angle to provide input that matches the input stored for authentication.

Another biometric authentication technique that is increasingly accepted is to incorporate finger-print scanners into the mobile computing devices to for easier interactions and secure authentication. However, capturing higher-quality fingerprints requires a reliable sensor and thus high production quality which causes this component to incur considerable costs. Moreover, as new hardware needs to be incorporated into the devices, existing mobile computing devices that do not possess the requisite hardware are not enabled for implementing such authentication mechanisms.

Embodiments described herein pertain to improving functionality of mobile computing devices to incorporate biometric authentication techniques with existing hardware components thereby mitigating the need for incorporation of additional hardware. In some embodiments, capacitive sensing capabilities of the touchscreen—a component that is ubiquitously present in more than a billion mobile computing devices globally—are employed for implementing biometric authentication procedures. The methodologies described herein can complement or replace the secret-based encryption/authentication. Spatial data obtained from the capacitive touch sensors is used to capture biometric features of a user. The capacitive touch sensors are used to capture biometric data by placing them on one or more of a part of the user's body or on a tangible object.

In some embodiments, the biometric data is used to extract a feature set which can be used as a key to unlock a vault of other possible stronger keys. The stronger keys are used to encrypt, decrypt, verify or sign documents and authenticate the user against various services running on a mobile computing device or a remote device using the touchscreen of the mobile computing device as a login tool. In some embodiments, the key is directly used to encrypt, decrypt, verify or sign documents and authenticate the user against various services running on a mobile computing device. The advantage of such embodiments is that the mobile computing device needs no knowledge about the key. No key verification occurs. Instead, upon using a correct key, the data is decrypted successfully. If the key is wrong the data will be unintelligible.

Turning now to the figures, FIG. 1 is an illustration of an embodiment of a mobile device 106 that comprises a biometric authentication module 100 in accordance with some embodiments. The biometric authentication module 100 enables obtaining the biometric data of a user's 102 body part, for example, the user's ear 104 to authenticate the user 102 and thereby enabling the user to execute various functions via the mobile computing device 102. Employing the user's car 104 is described herein only as a non-limiting example. The biometric authentication module 100 can reliably recognize and identify different users of the mobile device 102 based on various features of other body parts that can be used for authenticating users in accordance with some embodiments detailed herein.

In FIG. 1, the authentication can enable the user 102 to receive an incoming phone call. When the mobile device 102 rings or otherwise provides an indication of an incoming phone call or if the user 102 desires to make a call, holding up the mobile device 106 against the ear 104 for authentication can enable a one-step authentication and execution mechanism. The user 102 therefore does not provide any other authentication input. Rather, the user 102 is authenticated and allowed to receive or place the call just by holding up the mobile device 106 against his ear 104. It may be appreciated that the user's call interaction with the mobile device 106 is described herein only as one example and that other interactions are possible as will be described further infra.

The biometric authentication module 100 therefore, enables authenticating different users to the mobile device 102 based on their respective biometric information. For example, a single user 102 can provide biometric data of different body parts such as but not limited to, fingers, palms, side of a fist, phalanges or even facial features such as the nose to enable authentication to execute different actions. In some embodiments, biometric data of respective body parts of other users can be employed to authenticate the other users for different actions. This feature enables the biometric authentication module 100 for providing limited interaction capability for some users. In some embodiments, the biometric authentication module 102 enables the mobile device 106 to load different user profiles based on the received biometric authentication data.

The user's 102 interaction with the mobile device 106 begins with the mobile device 106 sensing the user's ear 104 as shown at 110. In some embodiments, the user's ear 104 is sensed by the touchscreen of the mobile device 106 when the user's ear 104 is in physical contact with the mobile device 106. Touchscreens exist that can sense the presence of objects hovering close to the screens and hence the touchscreen of the mobile device 106 can sense to the user's ear 104 even if the user's ear 104 is not in physical contact with the touchscreen. The biometric authentication module 100 uses the capacitive touchscreen as an image sensor and hence can be readily incorporated into existing touch-based mobile devices. Upon sensing the user' ear 104, the touchscreen of the mobile device 106 collects the raw data as shown at 120. As a one-to-one mapping exists between the touchscreen of the mobile device 102 and its corresponding sensor array, the need for controlling for factors like a view perspective or for a zoom ratio are eliminated. Touchscreens currently existing in mobile devices provide lower but adequate sensing capabilities to discern between different users especially as larger touchscreens are used in mobile devices. Moreover, improvements for increasing the resolution of the touchscreens can enhance the raw data collected for user identification. A color-coded image of the proximity data of the user's ear 104 obtained by the touchscreen of the mobile device 106 during the interaction at 110 is shown at 120. Lighter shades indicate higher intensities and hence portions of the ear 104 closer to the mobile device's 106 touchscreen while darker shades indicate portions of the ear 104 further away from the touchscreen.

In some embodiments, the capacitive sensing data of the touchscreen can be obtained from a kernel of an operating system running on the mobile device 106. Hence, the proximity information of the ear 104 is obtained from each of the touchscreen pixels as shown at 120. The features 108 of the ear 104 are determined as shown at 130 from the proximity data. The feature data obtained at 130 can comprise the general shape and size of the user's ear as well as its distinct patterns. The patterns can include the bumps, curves and hollows that exist due to the ear's cartilage and bones and their arrangement within and forming the user's ear 104. The determined features 108 are compared with biometric data of authorized users in order to determine if the user 102 is authorized to execute a function on the mobile device 102. Data regarding authorized users stored in a processor-readable storage medium of the mobile device 106 can be used for authentication purposes.

In some embodiments, the determined features 108 can be used as keys to unlock a vault of stronger keys or passwords. The stronger keys can then be employed by the user 102 to be authenticated for carrying out certain tasks on the mobile device 106. For example, the stronger keys thus obtained can be further input by the user 102 via touch or voice to access functions such as but not limited to answering a call, reviewing messages, viewing media content and similar functionalities can be allowed based on a comparison of the determined features 108 with stored data. In some embodiments, the determined features 108 are used as keys to directly unlock the functions for the user 102. In this case, when the user 102 presses his ear 104 against the touchscreen of the mobile device 104, an incoming call can be automatically activated without any further input from the user 102 even when the mobile device 106 is otherwise locked.

In some embodiments any feature on the user' 102 body that's coarse enough to be covered with sufficient resolution by the touchscreen as the sensing element can be used as the authentication object or the target. This at the same time covers more fine-grained details of the body as the input resolution of touchscreens increases in the future. If the resolution increases, finer structures, such as shape of the eye and eyelids and the subtle differences in the various layers (eye ball, eye lid, eye brow) will show up as different connected components in the capacitive image (which at the same time serves as a depth map). For example, when the input resolution of touchscreens approaches 500 dpi, raw sensor data for users' fingerprints, super-fine structure of the ear, eyes, etc. can be obtained directly for identification/authentication purposes.

In certain embodiments, an identification or authentication object other than a user's body part can be used to authenticate a user to execute functions. By the way of non-limiting examples, imprints of identification objects such as pendants, keys, rings, studs or other items can be provided as a password to lock the computing device 106. At the time of setting the password, a selected object can be pressed against the touchscreen in order for the mobile device 106 to receive the feature data of the identification object. The feature data can include but is not limited to, the shape and size of the object, the nature of the object surface, ridges, hollows, gradients, edges, points or patterns on the surface pressed against the touchscreen. Algorithms currently known such as but not limited to Harris corner detection, Canny edge detection, Histogram of Gradients, SIFT (Scale-invariant feature transform) and SURF (Speeded Up Robust Features), and FREAK (Fast Retina Keypoint) or algorithms yet to be invented can be used to extract the feature data of an object or body part.

When a user desires to execute a function on the computing device 106, the user can press the same surface of the object against the touchscreen. In some embodiments, this can unlock a vault of stronger passwords adding further layers of security where desired. In some embodiments, the feature data of the object itself acts as a password to unlock the mobile device 106 and execute the desired function. This enables a user to permit other users to use the computing device 102 as the object can be passed on from one person to another. For example, a guest profile can be additionally created on the computing device 106 with the features of the object surface as the password so that a user can let others use the computing device 106 in his/her absence.

In some embodiments, the user data can be authenticated without the need to store the data within the mobile device 106. For example, functions such as but not limited to opening a document may not necessitate authorized or authenticated user data to be stored within the mobile device 106. Rather, the biometric feature data 108 can be used as a password to lock the document. When the biometric feature data 108 is supplied at a later time, the document is automatically unlocked for one or more of review and editing. The mobile device 102 has no need to even identify the authorized user in this case.

The biometric feature data 108 obtained in accordance with embodiments described herein can be employed in various situations that warrant user authentication. By the way of non-limiting example, they can comprise unlocking the mobile device 102, authenticating in-app purchases via the mobile device 106, additional verifications in applications, for example, a pin code protecting local or remote application content, deleting local or remote files, payments, remote authentications such as during a call when an operator may ask the users to identify themselves and they would simply press a designated body part against the touchscreen.

Figure 2:
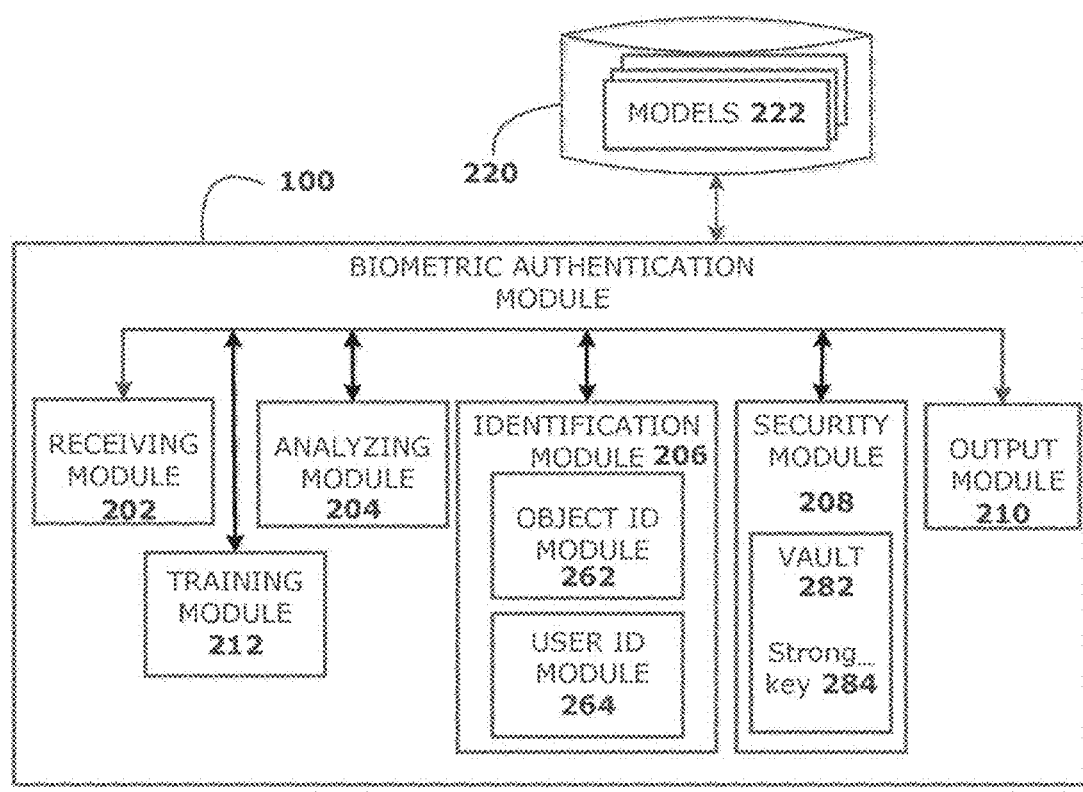
FIG. 2 is a block diagram illustrating the details of the biometric authentication module in accordance with some embodiments.

FIG. 2 is a block diagram illustrating the details of the biometric authentication module 100 in accordance with some embodiments. The biometric authentication module 100 is stored in a processor-readable medium and executed by a processor both of which are comprised within the mobile device 102. The biometric authentication comprises a receiving module 202, analyzing module 204, user identification module 206 and a security module 208. When a target or an authenticating object is placed in proximity to the touchscreen of the mobile device 102, the receiving module 202 begins to receive the proximity data of the object. As discussed herein, one or more of body parts or non-living objects such as but not limited to keys or pendants can be used for identification or authentication purposes.

For example, the touchscreen can be operated as an image sensor with 27×15 pixels over a 4.95" screen (6.24 dpi). When in contact with the target, the receiving module 202 captures object attributes such as but not limited to the capacitive properties of the object, including its 2D shape when pressed against the surface of the touchscreen, its conductive behavior, as well as the 0.5D profile obtained from the hovering parts.

The authentication object such as the user's car 104 can be in contact with a touchscreen of the mobile device 106 in different ways. In some embodiments, the mobile device 106 is pressed against the authentication object for a certain time period for the receiving module 202 to collect object data. In some embodiments, the mobile device 106 can be swiped across a surface of the target so that the receiving module 202 continuously collects data which can be stitched into one large frame. This allows the biometric authentication module 100 to characterize even bigger targets for user authentication. The receiving module 202 collects thus collects frames of capacitive sensitive data during the interaction of the object with the touchscreen or until timeout.

In some embodiments, the mobile device 106 can be operating in different modes comprising at least a recording or configuration mode and an identification and/or authentication mode. During the recording mode wherein user information is collected for generating models that are stored in a processor-readable storage medium 220. When operating in the recording mode, the sensor data from the touch screen is obtained by the training module 212 that generates, stores and trains the models 222. The models can be generated based on the feature data of the targets employed by the users. In some embodiments, a target can comprise one or more of a body-part or a conductive object. When body-parts such as a fist or fingers are used, a combination of the body-part and its pose can form the target. Hence, the same body-part in different poses can comprise different targets. In some embodiments, a combination of the body-part with a conductive object can comprise a target. Accordingly, a plurality of models 222 can be generated for identifying unique users by obtaining samples of just the body-part (captured from all known users of the mobile computing device 106). In some embodiments, the models 222 are generated by extracting and storing the SURFs (Speeded Up Robust Features) of all the training samples. In some embodiments, other algorithms known in the literature of computer vision, including Harris corner detection, Canny edge detection, Histogram of Gradients, SIFT (Scale-Invariant Feature Transform) and FREAK (Fast Retina Keypoint) can be used without limitation for the training/analysis purposes).

When the mobile device 106 is operating in an identification/authentication mode, the raw frame data obtained by the touchscreen is processed by the analysis module 204 to extract key-frames for user identification. After all the frames are collected, the frame with the highest intensity (b) is initially identified by the analysis module 204. The received frames are sorted into a finite number of groups or bins based on their respective intensities. By the way non-limiting example, the received frames can be sorted into five bins with five intensity intervals ranging from 0 to b. As the frames of the lowest intensity bin generally do not contain enough information for user identification, this bin is dropped from further processing.

A bin-frame is generated for each of the remaining four bins by averaging their intensity intervals. The contours and gradients at different intensity levels are emphasized in each of the four bin-frames. By the way of non-limiting example, a plurality of scaled key frames, for example, three key frames can be generated via applying different mappings to each of the bin frames to generate key frames of different scaling types. By the way of non-limiting example, a linear scaling of the bin frame can generate one of the key frames. The logarithms of a pixel's intensity are obtained and then normalized in order to generate another key frame that accentuates details at lower intensities. Similarly exponential scaling at each pixel generates a third key frame for an intensity bin that stresses details at higher intensities. Thus, three key frames each of different scaling types are generated for each of the four bins. It may be appreciated that the number and type of key frames are described herein only by the way of illustration and not limitation. Other methodologies can be used in accordance with embodiments described herein to generate more or less number of key frames of different scaling types.

In some alternate embodiments, the original bin-frame and the two of the scaled frames, exponential and logarithmic scaled frames can be concatenated and magnified with cubic interpolation to form a key-frame for each of the four bins. For example, the frames can be magnified 8-16 times to generate the key-frame. In this case, four key frames can be respectively generated for each of the four bins and further identification processing occurs based on the four key frames.

The key frames corresponding to each of the intensity bins thus generated by the analyzing module 204 are received by the identification module 206. The object id module 262 comprised within the identification module 206 identifies the object used for identification/authentication. In some embodiments, the key frames associated with each of the four intensity bins are analyzed in accordance with the corresponding object models. In some embodiments, a plurality of models corresponding to the different scaling types can be accessed by the identification module 206 for matching the key frames from the respective bins. Each object that can be used for authentication with the mobile computing device 106 can be modeled at each intensity bin level. Accordingly, for a given target (which in the example of FIG. 1 is the user's ear 104) employed by the user 102 for identification and/or authentication purposes, four of the models 222 corresponding to each of the four intensity bins are used by the object id module 262 in recognizing the target 104.

During an identification process, the key-frames are matched to twelve models corresponding to respective intensity bins and respective scaling types. The models associated with each intensity bin compete for the best match with the respective key-frame. The match between the key frame and a model is the average distance of the set of feature pairs (P) with minimum L2 distance found by crosschecked brute-forcing key frame SURFs ($S_k$) and model SURFs ($S_m$). That is, $$\forall s_1 \in S_k, s_2 \in S_m : (s_1, s_2) \in P \text{ iff}$$

$$s_1 = \text{argmin}_{s_k \in S_k} L2(s_k, s_2) \text{ and } s_2 = \text{argmin}_{s_m \in S_m} L2(s_m, s_1)$$

The model with the lowest average distance is considered the best match corresponding to each of the bins. Other measures such as but not limited to Kullback-Leibler divergence or Jensen-Shannon divergence can also be used to find a match between the key frame and a model in accordance with some embodiments. Finally, simple voting combines model predictions corresponding to all the bins. If a model prediction receives more than a vote percentage threshold of the vote, the object that is represented by that model is assigned or recognized. If no model receives a more than a vote percentage threshold of the vote, the identification process is terminated for insufficient data.

The user id module 264 also comprised within the identification module 260 receives the data regarding the object from the object id module 262 and further analyzes the data to identify the user 102 associated with the object. In some embodiments, the user id module 264 accesses models 222 from the processor-readable data storage 220. Each of the models 222 is trained with just the positive examples for what the model represents. A model, for each training sample, extracts the SURFs along with their locations and sizes and stores them as separate sets.

In some embodiments, the object can be a body-part such as the user's ear 104. In some embodiments, a non-living thing such as a pendent, a key or a ring can be used for identification and/or authorization purposes. Again, the user id module 264 employs a model for each body-part of a known user corresponding to each of the four intensity bins.

During an identification process, the information regarding the object or body part from the object id module 262 can be used to eliminate most of the models from the outset. For example, if the object is identified as a user's ear, then those models from the plurality of models 222 associated with authorized users' other body-parts such as a fist, thumb and the like and other conductive objects are removed from consideration. A subset of the remaining models corresponding to each of the intensity bins compete to be the best match for the respective key frames. In the above example, only models associated with unique users' ears may be considered. Each SURF of a respective key-frame is matched against the SURF sets in the model, for example by using the distance calculated in accordance with the equation shown above and two best matching pairs, per set are identified. A pair is considered well-matched if and only if its matching distance is less than 70% of the second pair's distance. For each set in the model, the homo-graphic projection between it and the key-frame are found using the well matched pairs. If the projection is scaled or perspective corrected, the set in the model is considered a mismatch for the key-frame. Finally a model is considered for competing for a key-frame if and only if less than a set match percentage threshold of the sets in the model are mismatched. The matching closeness of the entire model to the key-frame is the sum of the inverted distances of all well matched pairs.

The best matching model generated from each intensity bin represents the prediction of the user's identity based on that intensity bin data. The predictions of the four levels are combined and if a prediction receives more than a vote percentage threshold of the vote the user is identified based on such model by the user id module 264. Referring again to the above example, among the unique user car models, the user is identified via the model that receives more than a vote percentage threshold of the vote. The user id module 264 can then enable further interactions for the authenticated user 102. Otherwise the authentication is halted by the biometric authentication module 100 for insufficient information and the user is prompted to retry by the output module 210. For example, if the user is attempting to receive a phone call, the user id module 206 upon identifying the user can send out a signal to the call-receiving hardware of the mobile device 106 to accept the call. Similarly in another instance, if the user 102 is attempting to send an email, the user id module 206 can open or activate the email application on the mobile device 106 upon the user being authenticated. Therefore, it may be appreciated that the user identification and authentication process described herein occurs almost instantaneously for the biometric authentication module 100 to be usable in the real-world. In some embodiment, the vote percentage threshold for body-part identification, set-match percentage threshold and the vote percentage threshold for user identification can be varied to fine tune between usability-security tradeoffs.

The biometric authentication module 100 further comprises a security module 208 for executing certain authentication functions with or without the knowledge of the user identification. The authentication functions can comprise without limitation, enabling a program, encrypting data or decrypting data such as for opening a document. In some embodiments, user identification information determined by the identification module 206 is provided to the security module 208. The user information thus obtained is used by the security module 208 to unlock a vault 282 that comprises stronger keys 284. The stronger keys 284 can be provided to the user 102 who employs them to execute further tasks on the mobile device 106. The stronger keys 284 may be employed by the user 102 access an application, data file or execute other tasks on the phone.

In some embodiments, the biometric feature data obtained by the security module 208 can be used to carry out the authentication functions associated with a plurality of users without the need to store their biometric information. For example, if a document encrypted by biometric feature data of a plurality of users is to be accessed via the mobile device 106, then each of the plurality of users can provide his/her biometric information to the receiving module 202 in a manner similar to the biometric feature data 108 provided by the user 102. The biometric feature data of the plurality of users provided to the security module 208 can be used to decrypt the document. In an embodiment, the document accessed or encrypted by the plurality of users can either be stored locally on the mobile device 106 or remotely for example, on cloud storage. In some embodiments, the document is not unlocked or decrypted if at least one of the plurality of users is not authenticated. In some embodiments, the document can be decrypted by providing biometric feature data of a subset of the plurality of users.

In some embodiments, the biometric feature data obtained by the security module 208 can be used to carry out the authentication function without the need for intermediate processing by the other modules as described herein. For example, if a document encrypted by a plurality of users (not shown) is to be accessed via the mobile device 106, then the other users can provide their biometric feature data to the receiving module 202 in a manner similar to the biometric feature data 108 provided by the user 102. The biometric feature data of the other users is provided to the security module 208 which can use such data to decrypt the document. In this example, the mobile device 106 need not store identification or feature information of the other user in order to enable the encryption/decryption functions via the security module 208 in accordance with the embodiments described herein. However, physical interaction of the other users with the mobile device 102 is required for encrypting/decrypting the document. Moreover, the documents accessed or encrypted by the other users can either be stored locally on the mobile device 106 or remotely for example, on cloud storage. The security module 208 thus enhances privacy, security and convenience of use. It may be appreciated that the methodology described herein is rather deterministic in that it does not involve maintaining states or checking the accuracy of the biometric features provided by the user. If a user provides biometric features, the document will be "decrypted" using them. But the result will be garbage data if the other user's biometric features were not initially used for encrypting the document. The decryption is deterministic using the salient features as direct input.

In some embodiments, the user identification information determined by the identification module 206 is provided to the output module 210 which in turn enables an appropriate action to be executed. The output module 210, for example, can signal an appropriate component or module associated with the functionality that the user 102 desires to access. For example, if the user 102 desires to receive an incoming phone call, the output module 210 can signal the phone software on the mobile device 106 to connect the call. In another example, if the user 102 desires to open a data file, the output module 210 can signal an application to open the data file. In some embodiments, a particular user profile associated with the user identification information can be enabled on the mobile device 102.

Figure 3:
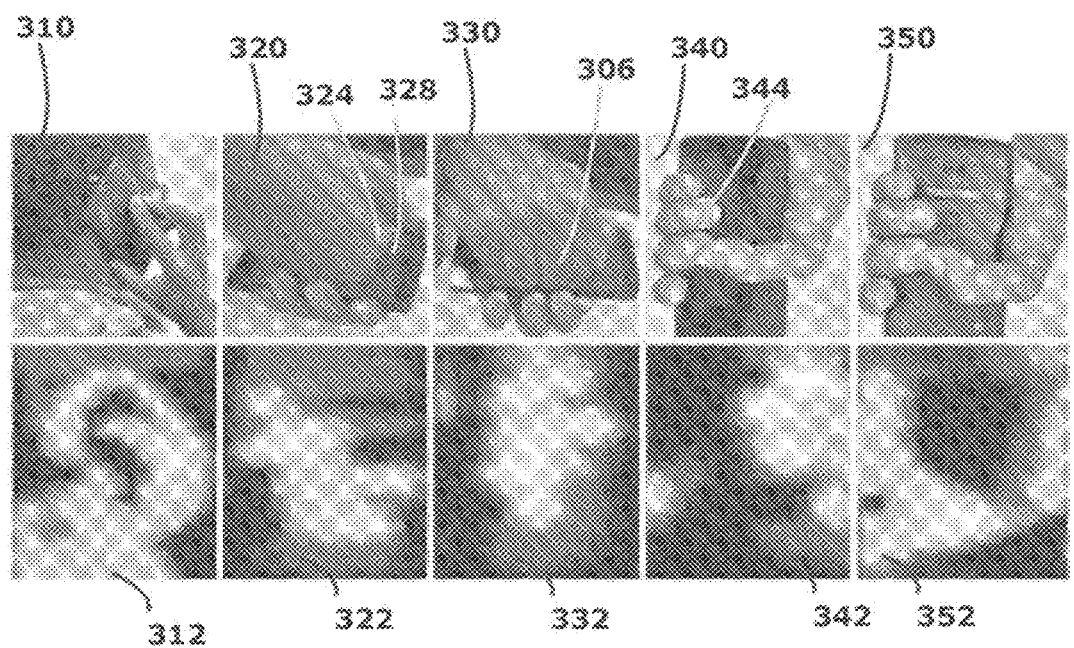
FIG. 3 is an illustration that shows certain non-limiting user interactions with a mobile device and the collection of biometric data in accordance with some embodiments.

FIG. 3 is an illustration that shows certain non-limiting user interactions with a mobile device 106 and the collection of biometric data in accordance with some embodiments. As detailed herein, a user 102 can employ various body parts for encryption/authentication. At 310 the user 102 employs his ear 104 for encryption/authentication and 312 shows a heat map of capacitively sensed biometric data of the user's ear 104. At 320 the user 102 employs his fist 306 for encryption/authentication. More particularly, the user 102 presses his proximal phalanges 324 against the touchscreen 328 of the mobile device 102 for the encryption/authentication. A heat map 322 of the biometric data of the user's proximal phalanges 324 capacitively sensed by the mobile device 102 is shown. At 330, the user 102 employs the middle phalanges (not seen) of his fist 306 for encryption/authentication and a heat map 332 of biometric data of the user's middle phalanges capacitively sensed by the touchscreen 328 is shown. The touchscreen 328 can be one of a capacitive touchscreen, an optical in-cell touchscreen or resistive low/medium/high resolution pressure sensing touchscreen.

At 340, the user 102 employs the distal phalanges 344 for encryption and/or authentication and a heat map 342 of biometric data of the user's distal phalanges 344 capacitively sensed by the touchscreen 328 is shown. In this instance, the user 102 grips the mobile device 106 such that the user's fingers encircle it without overlapping each other. At 350 the user 102 again employs the distal phalanges 344 for encryption/authentication and a heat map 352 of biometric data of the user's distal phalanges 344 capacitively sensed by the touchscreen 328 is shown. However, upon comparing the heat maps 342 and 352, it may be noted that the biometric data collected at 340 is different from the biometric data collected at 350 although the user's distal phalanges are used in both instances. This is because of the different postures adopted by the user's fingers at 340 and 350. At 340, the user's fingers do not overlap each other whereas at 350, the user's 102 fingers overlap each other. Thus, the different positions of the body parts can lead to different biometric data being received by the biometric authentication module 100. Such features can be used for providing different gestures as authenticating input for different interactions while using the same body-part. By the way of non-limiting example, the user's 102 grip at 340 can be used to unlock an application while the user's 102 grip at 350 can be used to encrypt/decrypt a document. It may be appreciated that embodiments are described herein with respect to smartphones only by the way of illustration and not limitation. Biometric authentication techniques as detailed herein can be implemented in any device that comprises capacitive sensing capabilities.

Figure 4:
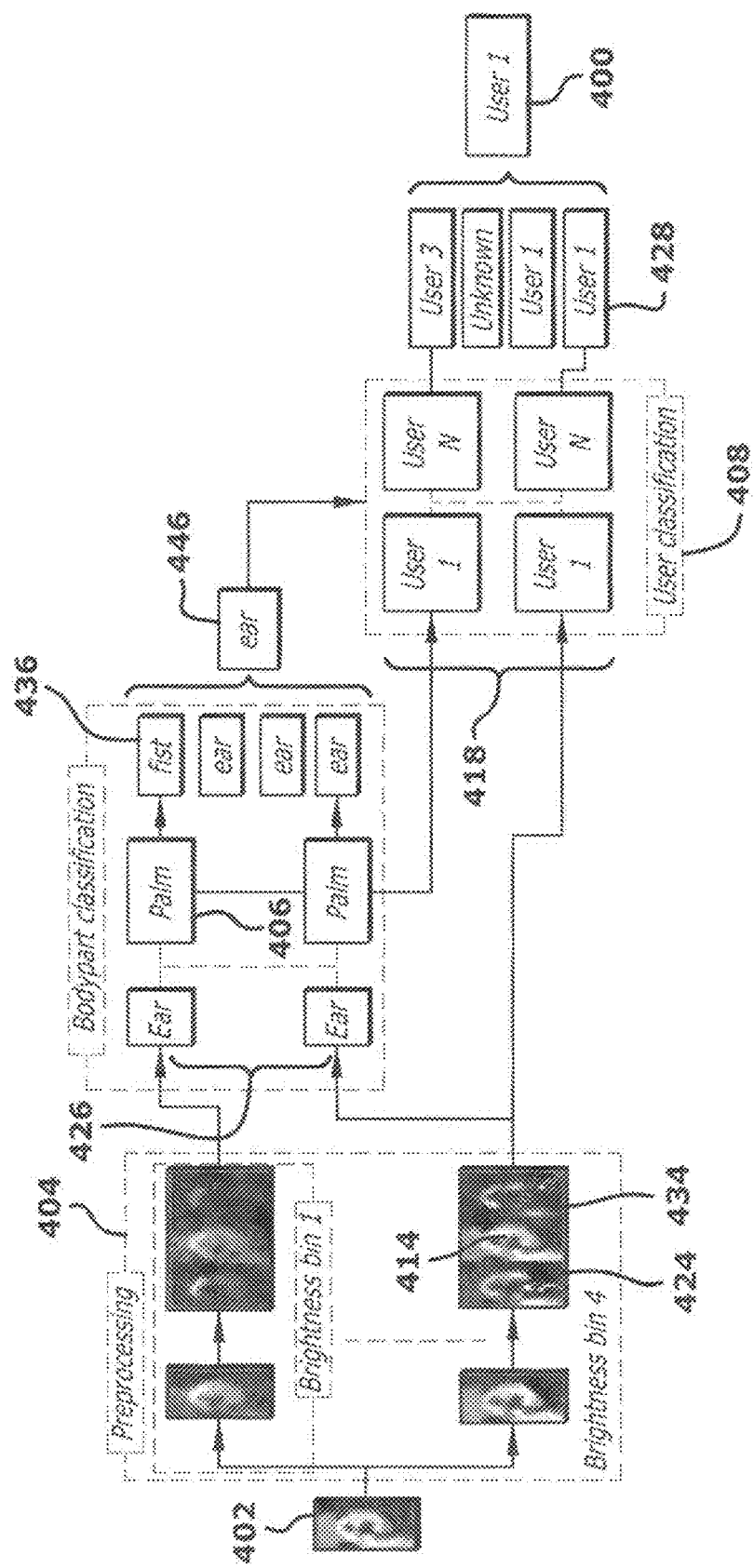
FIG. 4 is a schematic figure of the biometric data received and analyzed by the various modules of the biometric authentication module in accordance with some embodiments.

FIG. 4 is a schematic figure of the biometric data received and analyzed by the various modules of the biometric authentication module 100 in accordance with some embodiments. The user's ear 104 is sensed and frames of capacitive sensor data is collected by the receiving module 202 during the ear's 104 interaction with the touchscreen 328 at 402. The biometric data thus received is analyzed at 404 for further processing to identify the user/body-part combination. At 404, the frames data collected at 402 is sorted by the analyzing module 204 into a plurality of bins based on the intensities of the capacitive sensor data. Bins with insufficient information are dropped from consideration. For example, if the frames are sorted into five bins then the fifth bin comprising frames of the lowest intensity is not considered. Hence, only four bins are shown at 404. Furthermore, frames, contours and gradients of different intensity levels are emphasized in each of the four bins at 404. In some embodiments, three key frames 414, 424, 434 are generated for bin 4 by scaling respective bin frame linearly 414, logarithmically for lower intensities 424 and exponentially for higher intensities 434. Similarly, three key frames are generated for each of the other three bins.

At 406, a plurality of body-part models 426 corresponding to each of the bins are employed for each body-part and related posture that the object id module 262 is configured to recognize. Accordingly, models of different scaling types corresponding to the key frames for each body-part/posture combination are used for processing data from each of the four intensity bins. The various models at a given intensity bin and scaling type compete for the best match with the key frames 414, 424, 434 of that intensity bin. Accordingly, three models that best match the respective key frames for each bin are output at 436 and simple voting combines the predictions from all the levels and the prediction 446 that receives more than a vote percentage threshold is designated as the body-part employed for authentication.

The user id module 264 also employs a plurality of models—a model for each body-part of a known user for each intensity bin for identifying the user at 408. During an authentication process, the identified body part 446 is used to eliminate most of the other models from the outset. The remaining models of the different scaling type corresponding to each intensity bin compete to be the best match to the key frames 414, 424, 434 of that intensity bin. A model that best matches the key frames for each of the intensity bins is output at 428. At 400, the predictions of different scaling types associated with the four intensity bins are combined and if a prediction 400 that receives more than a vote percentage threshold of the vote, the user e.g., for example user 3 is identified by the biometric identification module 100.

Figure 5:
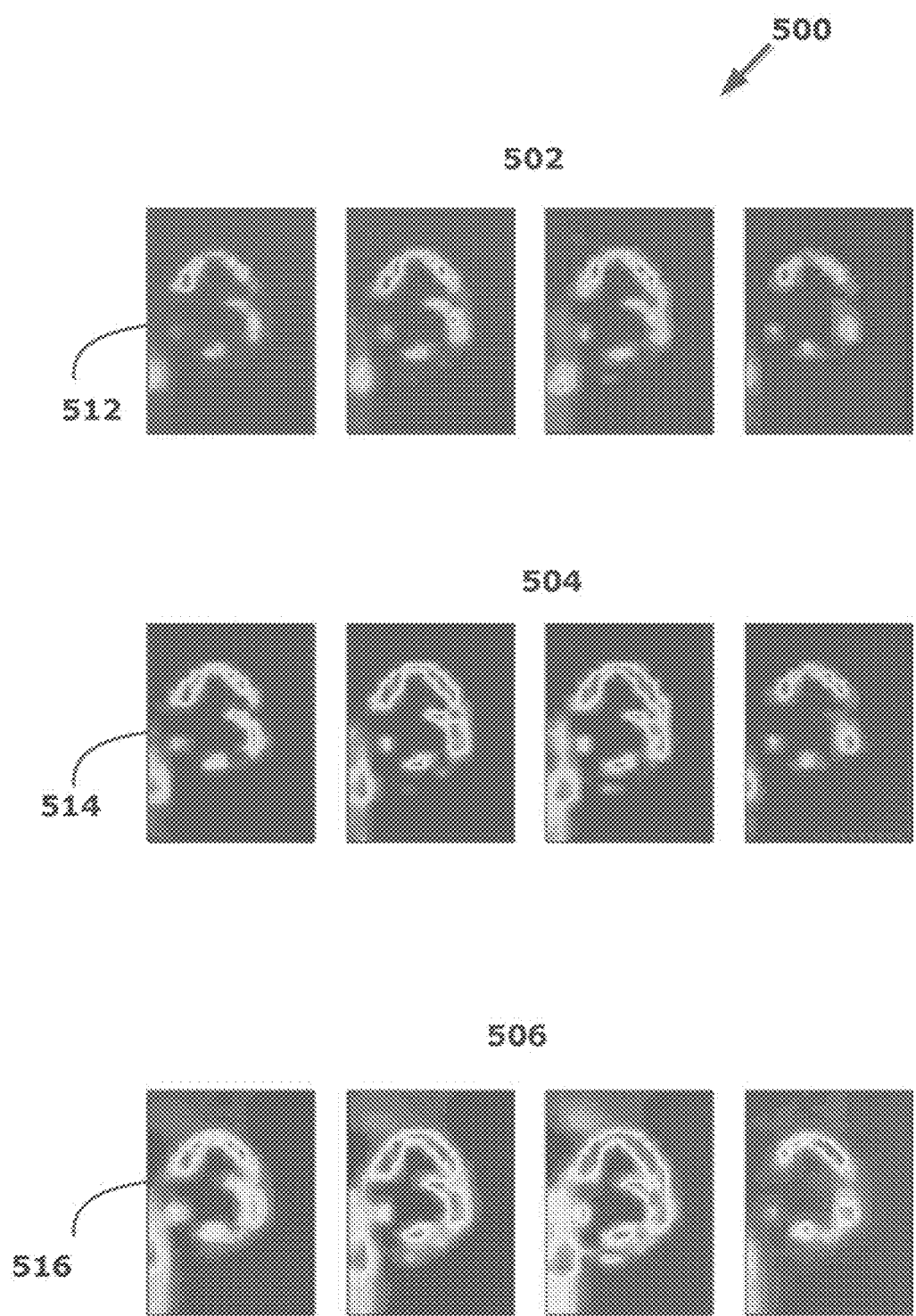
FIG. 5 is an illustration that shows images of the capacitively sensed data of a user's ear scaled in accordance with some embodiments described herein.

FIG. 5 is an illustration 500 that shows images of the sensed data of a user's ear scaled in accordance with some embodiments described herein. As described supra, when the frames of capacitively/optically/pressure sensed interaction data are obtained, they are scaled logarithmically as shown at 502 in order to accentual details at lower intensities. Four images are shown corresponding to each of the four intensity bins. Similarly, exponential scaling of the frames of capacitively sensed data as shown at 506 enhances details at higher intensities. The frames are also scaled linearly as shown at 506. Three key frames comprising a linearly scaled key frame 516, logarithmically scaled key frame 514 and an exponentially scaled frame 512 are thus formed for the first intensity bin. Similarly other images in the series of images 502, 504 and 506 corresponding to key frames of different scaling types formed for the second, third and the fourth bins are employed for identifying one or more of the body-parts and the users.

Figure 6:
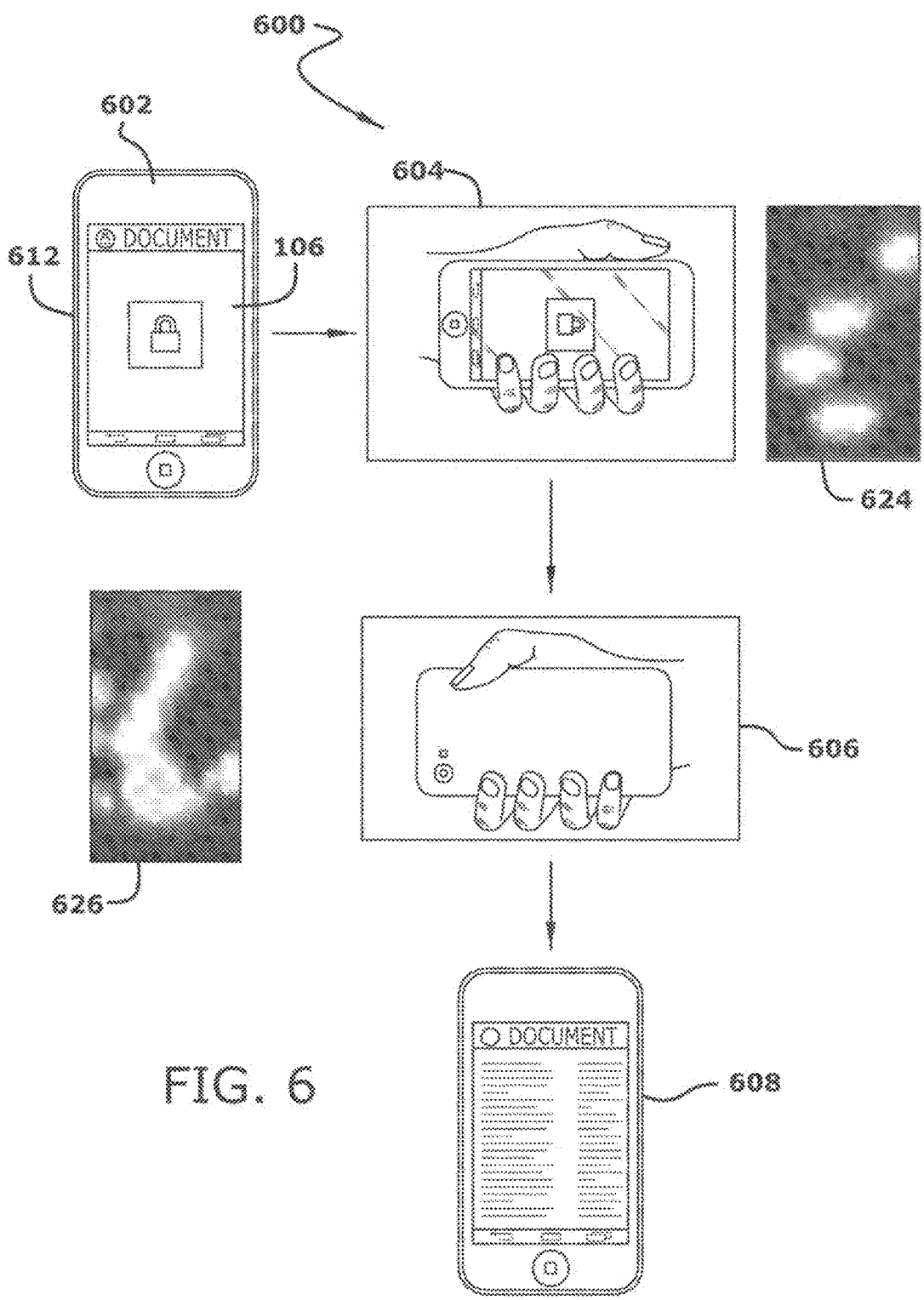
FIG. 6 is an illustration of an authentication process executed by the security module in accordance with some embodiments.

FIG. 6 is an illustration 600 of an authentication process executed by the security module in accordance with some embodiments. The authentication process described herein is based on the four-eyes principle. However, it may be appreciated that the authentication procedure details including the number of users, combinations of their body-parts and related gestures for providing the biometric information to the mobile device 106 are only described by the way of illustration and not limitation. Any number of one or more users using other body-parts, gestures or conductive objects can be employed authentication purposes in accordance with the embodiments described herein.

In some embodiments, the biometric features extracted from the target 104 are provided to a deterministic convolution function and the biometric features 108 thus input are convoluted in a way to generate a key. In some embodiments, the convolution function can be a known (potentially non-secret) mathematical function that convolves the document to be encrypted with the biometric features of the user 102. Therefore, the key will result if (and only if) the user 102 presses the same body part 104 against a touchscreen again. It may be appreciated that this procedure of authentication is rather deterministic in that no module checks the biometric data generated from the touchscreen interactions. If an unauthenticated user provides his/her biometric information in an attempt, to access the document the document will decrypt to provide garbage data.

In the example, shown in FIG. 6, a document 612 encrypted with the biometric data of two users, user A and user B, is received by the mobile device 106 at 602. Biometric information of user A gripping the mobile device 106 is received at 604. The biometric information can comprise feature data of user A's fingers that are in contact with the edge of the touchscreen 328 of the mobile device 106. A heat map representation of a portion of user A's biometric feature data obtained at 604 is shown at 624. At 606 the second user B grips the mobile device 106 in order to provide the biometric feature data of his hand. It may be noticed that the grip of user A is different from user B's grip. While user A holds the mobile device 106 around its edges, with the palm against the back of the mobile device 106, user B grips the mobile device 106 such that his palm is in contact with the touchscreen (not shown at 606). A heat map representation of a portion of user B's biometric feature data obtained at 606 is shown at 626. If the biometric data obtained at 604 and 606 is accurate, the document is unlocked as shown at 608.

The user identification or profiles of users A and B need not be stored on the mobile device 106 in some embodiments. If the document 612 was initially encrypted with the biometric feature data of the users A and B, then supplying such data to the document 612 will decrypt it. In some embodiments, the user identification information of one or more of the users A and B can be stored on the mobile device 106. It may be appreciated that a document can also be encrypted by users A and B with the biometric feature data by employing the mobile device 106 even if the mobile device 106 does not store any identification or profile information of the users.

In some embodiments, physical conductive objects such as but not limited to, house or car keys watches, metallic rings or pendants can be used for identification and/or authentication purposes in addition to or as an alternative for a user's body-parts. This enables a user to employ a body-part for authenticating purposes when employing a mobile device 104 for personal use while conveniently enabling other users to use the mobile device 104 via the conductive object. The recognition procedure for the conductive object can be similar to the procedure for identifying a particular user's body-parts.

Figure 7:
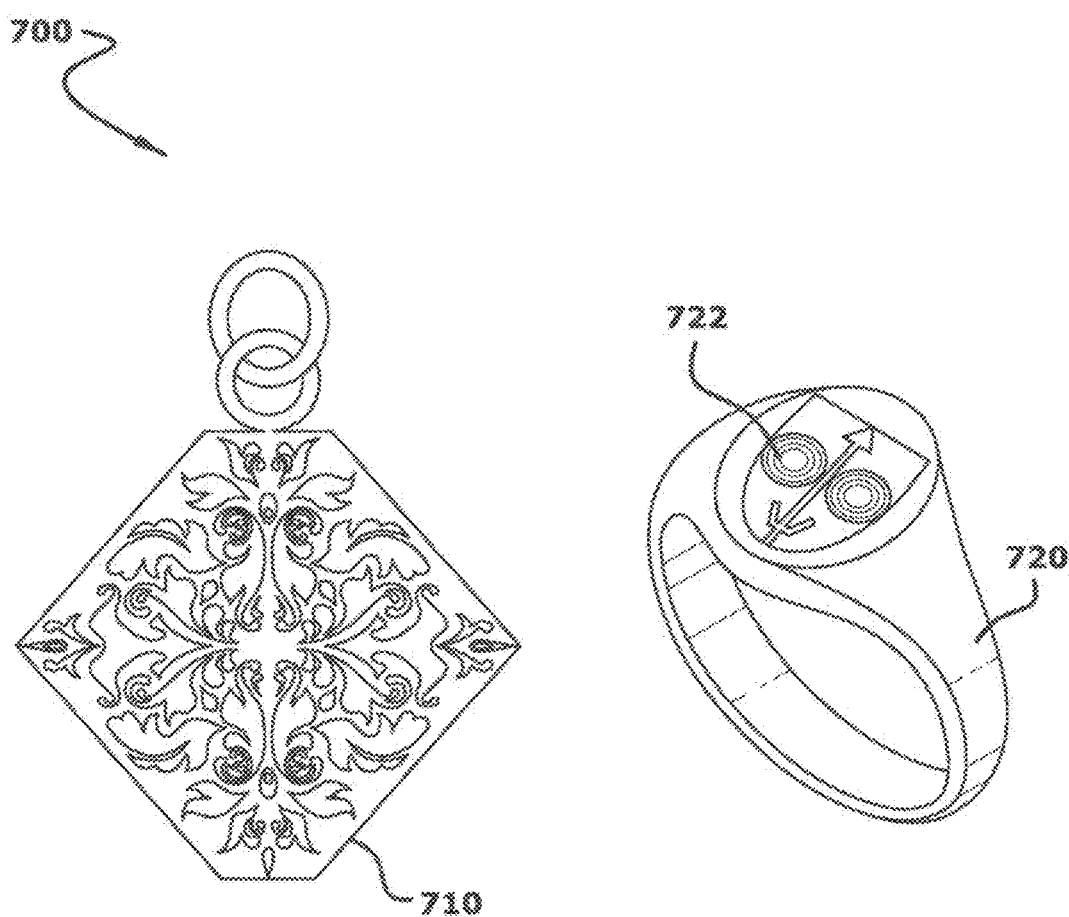
FIG. 7 is an illustration that shows examples of two objects that can be used for identification and authentication purposes.

As described herein, when in contact with the target or target, the received module 202 comprised within the mobile device 106 captures the capacitive properties of the target, including its 2D shape when pressed against the surface of the touchscreen, its conductive behavior, as well as the 0.5D profile obtained from hovering parts. With objects suitably designed for authentication purposes, the embodiments described herein can be used to extract very strong keys as the objects detailing can be adjusted to work with the biometric authentication module 100. Users can additionally scan passive objects that have been placed on the touchscreen 328 by touching them and/or dragging their finger across them. This causes a conductive object to be manifested in a more pronounced manner on the sensors associated with the touchscreen 328, yielding a raw image with more reliable and more pronounced features. FIG. 7 is an illustration 700 that shows examples of two objects 710 and 720 that can be used for identification and authentication purposes with the biometric authentication module 100. When a user places a conductive object such as the pendant 710 and drags his fingers across the touchscreen 328, the pendant 710 is manifested in an enhanced manner to the sensor array associated with the touchscreen. Similarly, the ring 720 comprises distinctive detailing 722 which makes it a good target to be used with the biometric authenticating module 100 in accordance with embodiments described herein.

Figure 8:
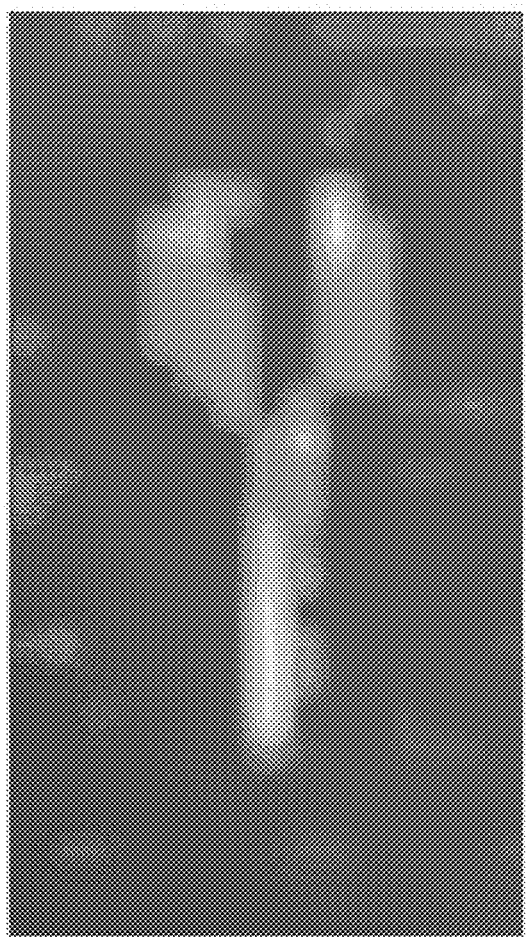
FIG. 8 is an illustration that shows capacitively sensed data of a key used as a target.

FIG. 8 is an illustration 800 that shows capacitively sensed data of a key used as a target. When the key is placed against the touchscreen 328, its feature data is recorded as shown herein as a heat map. Generally darker shades represent lower intensities while lighter shades represent higher intensities. The feature data can be used for various purposes such as but not limited to, user identification and authentication, encryption or decryption of documents or to execute other actions on the mobile device 104. When symmetric objects are used for authentication, the 2D or 3D orientation of the objects does not matter whereas when asymmetric objects like keys are used for authentication, they may need to be oriented in a particular position on within the touchscreen plane.

Figure 9A:
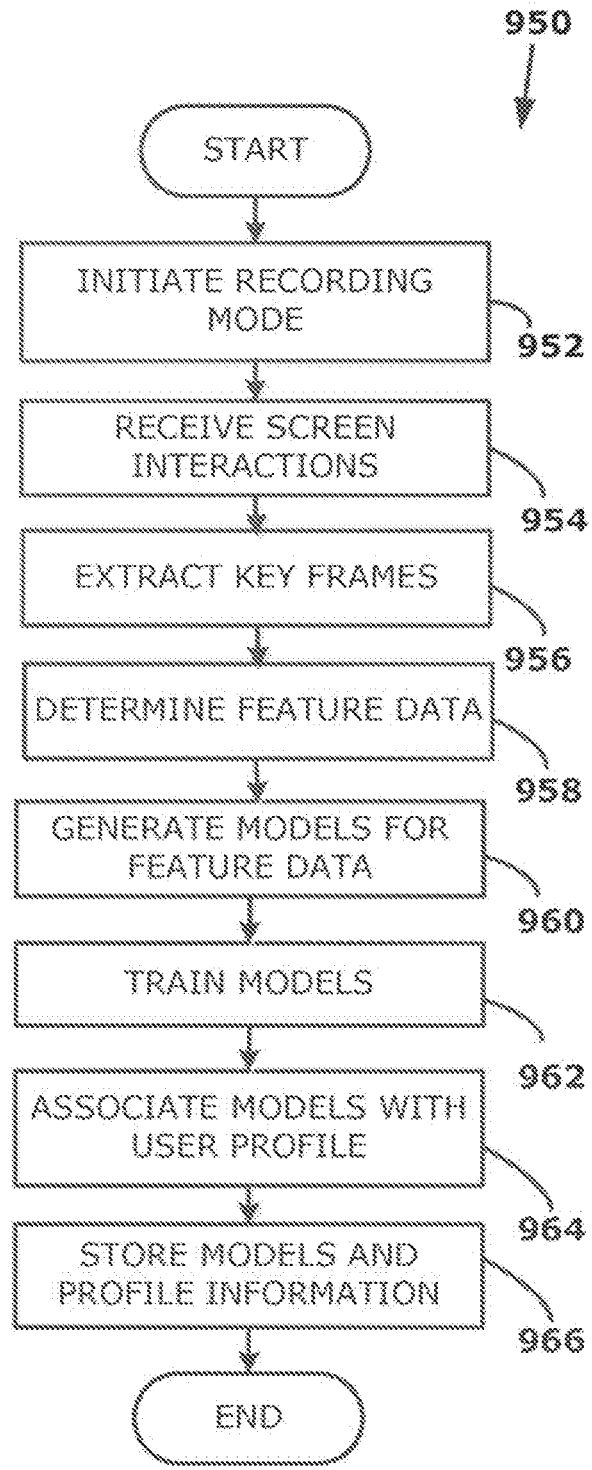
FIG. 9A is a flowchart that details a process of recording user data for identification and authorization purposes in accordance with some embodiments.

FIG. 9A is a flowchart 950 that details a process of recording user data for identification and authorization purposes in accordance with some embodiments. The method begins at 952 wherein the biometric authentication module 100 operates in a recording mode to receive user information. At 954, the screen interaction data of an object is received. In some embodiments, the object can be a target that the user intends to employ for identifying himself/herself to the mobile device 106 comprising the biometric authentication module 100. In some embodiments, the interaction data can comprise frames of sensor data. Multiple users with respective targets can be identified to the mobile device 106 via the biometric authentication module 100 and in some embodiments multiple profiles with different capabilities or rights can be activated for the users. Therefore, if a first user is recorded as an administrator for the mobile device 106, then the administrator's profile can be automatically enabled upon receiving the first user's authentication information which may comprise feature data of a first target that the first user employs for authentication to the mobile device 106. Another second user profile with more limited rights can be generated and associated with feature data of a second target that the second user employs for authentication to the mobile device 106. When the second user's authentication information (comprising feature data of the second target) is received, the second user's profile with limited rights is automatically enabled on the mobile device 106. The second user can therefore be restricted from carrying out certain tasks or accessing certain data.

In an embodiment, the biometric authentication module 100 can receive the information from the touchscreen by modifying the touchscreen module in the kernel source and activating the touch chip debug mode. For example, if the mobile device 106 is a LG Nexus 5 phone with a Synaptics touch chip, Synaptics debug mode is activated. This enables the biometric authentication module 100 to operate the touchscreen of the Nexus phone as an image sensor with 27×15 pixels over a 4.95" screen (624 dpi). The raw information from the sensor is shown as heat maps in FIGS. 1, 3 and 6.

At 956, the key frames are extracted in accordance with embodiments described herein. At 958 feature data of the object or target is determined. In some embodiments, feature data can comprise features of a target such as but not limited to a metallic pendant that a user can employ for authentication to the mobile device 106. In some embodiments, the feature data can comprise biometric information 108 of the user's body-part 104 that the user 102 employs for authentication. At 960 the feature data is used to generate at least one model that represents the target. In some embodiments, multiple models for different intensities corresponding to key frames of different scaling types can be generated for a single target. At 962 each of the models is trained with additional training samples. The training samples can comprise multiple captures of the target over different sessions. A model, for each training sample, extracts the SURFs along with their locations and sizes and stores them as separate sets in some embodiments. In some embodiments, the model representing the target can be associated with a particular profile at 964. For example, the user 102 can configure the mobile device 106 to load the administrative profile on supplying the biometric data of his/her body-part and to load a guest profile with limited access rights when the feature data of a conductive object is received. If no specific user profile is provided, a default user profile can be employed by the biometric authentication module 100. The model and the profile information is then stored at 964 for future authentication of the user in accordance with embodiments described herein.

Figure 9B:
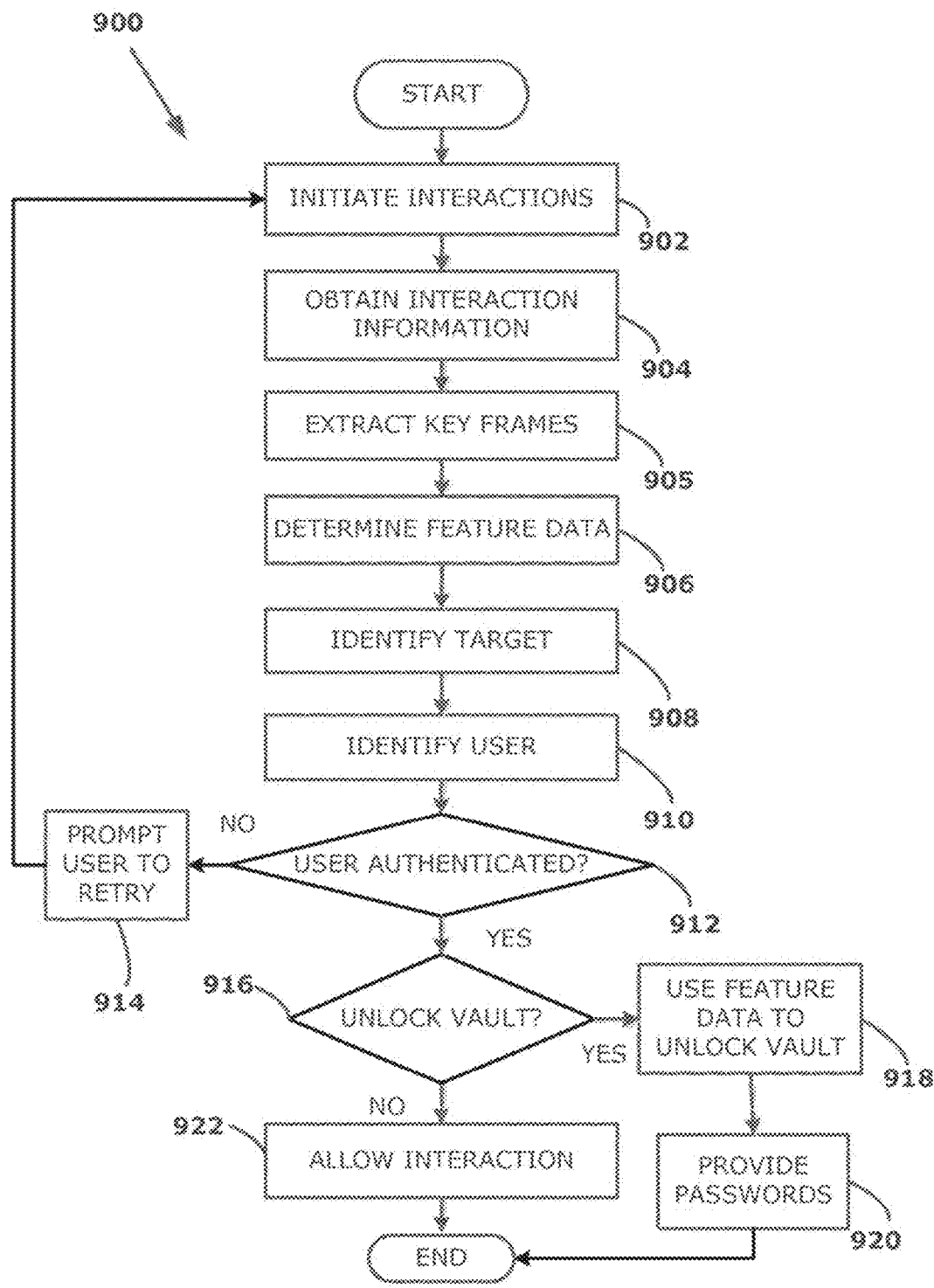
FIG. 9B is a flowchart that details a method of identifying/authenticating a user via biometric data in accordance with some embodiments.

FIG. 9B is a flowchart 900 that details a method of identifying/authenticating a user via biometric data in accordance with some embodiments. The method begins at 902 wherein a user interaction is initiated with the touchscreen 328 of the mobile device 106 for identification and/or authentication purposes. In some embodiments, the output module 210 comprised in the biometric identification module 100 can explicitly send a message requesting the user 102 to place a body-part such as the user's ear 104 or other identification object such as a key or a pendant in proximity to the touchscreen 328. In some embodiments, a signal that gains the user's 102 attention such as an incoming phone call on a smartphone can be an implicit request for the user 102 to provide the feature information.

At 904, interaction information of a target comprising one or more of a conductive object and a user body-part is collected when the object is in proximity to the touchscreen 328. As described supra, the interaction information can be obtained when the target is in proximity or target is pressed against the touchscreen 328 of the mobile device 106 in some embodiments. This is convenient for when smaller objects are used for authentication. Users' body-parts such as but not limited to fingers, fists, palms, back of the hand, back of the fingers including the knuckles, facial features such as ears, nose, lips (including their various poses) can be used for authentication on mobile devices. Interaction information for larger targets can also be obtained at 904 by collecting frames as the user swipes the mobile device 106 across a surface of the target. The received frames are stitched together to obtained a single large frame. The methodology described herein for capturing frames enables well-defined projection of the target as the target will exhibit the same size during each recording unlike camera-based approaches wherein target size can vary based on the distance of the camera from the target. Additionally, the methodology also takes advantage of the large capture area readily available on mobile devices having screen sizes ranging from 13 to 17 square inches.

At 905, the key frames of different scaling types are extracted from the data collected at 904 in accordance with embodiments described herein. The key frames are employed at 906 to determine the feature data of the user's target. The determined feature data is used in identifying the target, e.g., the body-part 104 employed by the user 102. The key frames and the target information from 908 can be used to identify the user at 910. At 912, it is determined if the user is an authenticated user. If it is determined at 912 that the user is not authenticated, it is recognized as a failure of the identification process and the user can be prompted at 914 to repeat the authentication process. The authentication process can fail if the user is not authorized or if the biometric data could not be collected. In some embodiments, the mobile device 104 can lock the user out after a predetermined number of failed authentication procedures.

If the user is authenticated at 912, it is further determined at 916 if the vault 282 should be accessed for retrieving passwords or stronger keys. If yes, the vault 282 is unlocked at 918 to provide the passwords 920 and the process terminates. If it is determined at 916 that the vault 282 does not need to be unlocked, the method proceeds to 922 wherein the user 102 is allowed further interaction 922 with the mobile device 106. The determination regarding the vault 282 can be based on system default selections or on user selections at the time of configuring the biometric identification module 100 on the mobile device 102. By the way of non-limiting example, the interactions allowed at 922 can involve the user receiving or making a call, activating an application, changing the settings/profile on the mobile device 104, accessing data files or transferring data via wireless connection. As described herein, the authentication process detailed in the flowchart 900 is almost instantaneous so that the user 102 only needs to provide the biometric data in order to be authenticated and to further carry out the desired function in the latter case where no vault access is needed.

Figure 10:
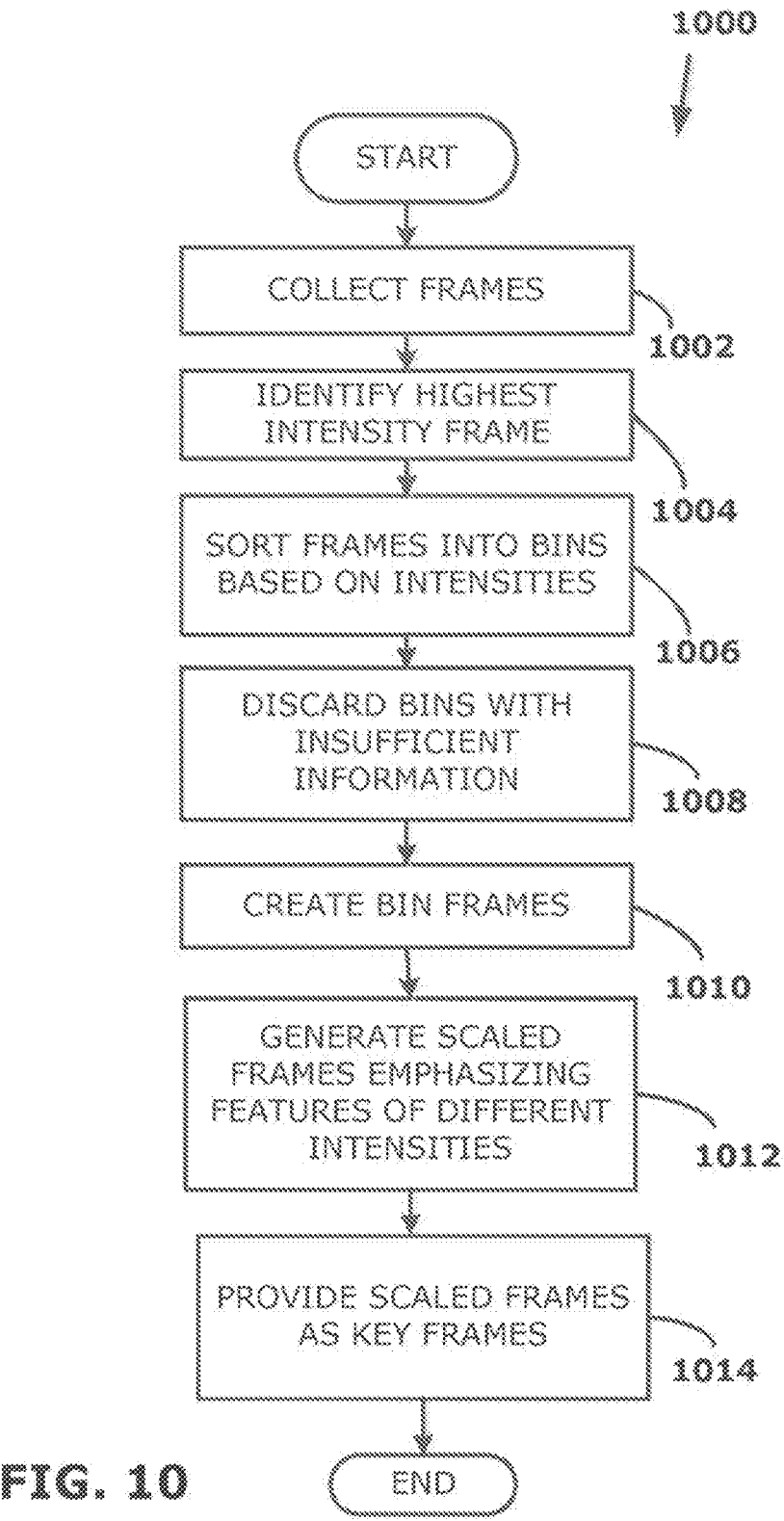
FIG. 10 is a flowchart that details a method of extracting key frames in accordance with some embodiments.

FIG. 10 is a flowchart 1000 that details a method of extracting key frames in accordance with some embodiments. The method begins at 1002 wherein frames of capacitively sensed information of a target are obtained. In some embodiments, the raw data from an array of capacitive touch sensors associated with the touchscreen 328 is used. The capacitive data is treated holistically by the biometric authentication module 100 as opposed to single touch points. At 1004, a highest intensity frame is identified by summing the intensities of all the elements in each received frame and comparing their total intensities. The frames received at 1002 are then sorted at 1006 based on their intensities into bins. For example, if the highest intensity is b, then the frames can be sorted into five bins with intensities ranging from 0 to b.

In some embodiments, the bins are of equal sizes. Some bins with insufficient information, generally a bin with the lowest intensity frames, are discarded at 1008. Respective bin frames are created for each of the remaining four bins by averaging the frames from each bin at 1010. Features such as but not limited to, contours and gradients at different intensities are emphasized in each of the four bin-frames. In some embodiments, by obtaining the logarithms of pixel's intensity and then normalizing can accentuate details at lower intensities. Similarly, exponential scaling stresses details at higher intensities. Thus, scaled frames emphasizing features at different intensities are generated at 1012. In some embodiments, the linearly, exponentially and logarithmically scaled frames are employed at 1014 for further identification and/or authentication processing.

Figure 11:
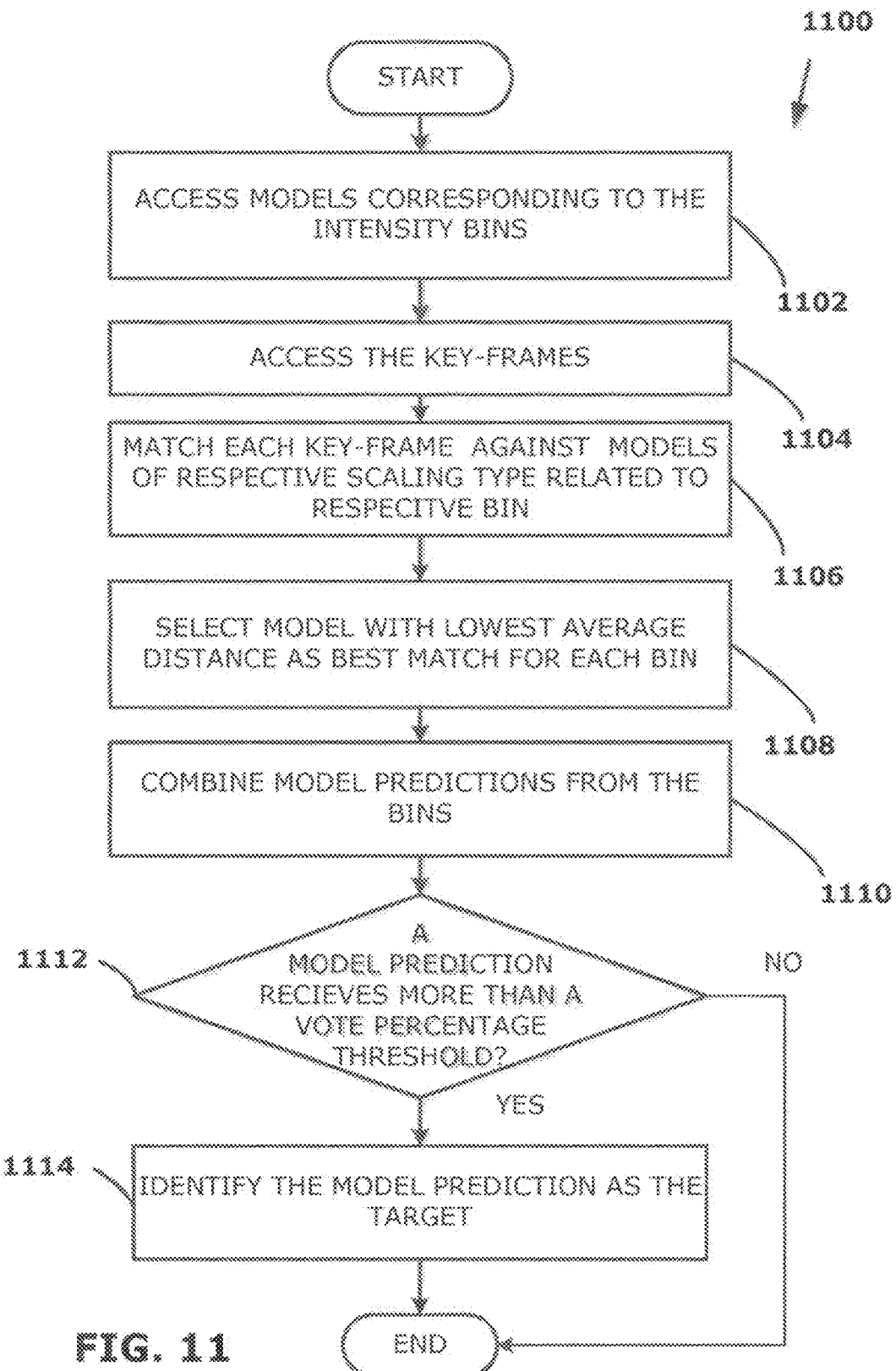
FIG. 11 is a flowchart that illustrates an embodiment of identifying a target such as a body-part or other object employed for authenticating a user in accordance with some embodiments.

FIG. 11 is a flowchart 1100 that illustrates an embodiment of identifying a target such as a body-part or other object employed for authenticating a user in accordance with some embodiments. The method begins at 1102 wherein models corresponding to the intensity levels associated with each of the intensity bins are accessed. In some embodiments, four levels of models each handling key-frames from an intensity bin can be used for each target that the biometric authentication module 100 is configured to identify. A model per target can be trained on samples of just that target. If the target is a body-part such as fingers, fist, palms or facial features, then the model can be trained on samples of that body-part captured from all known users of the mobile device 106, by extracting and storing SURFs of all the training samples. At 1104, the key-frames corresponding to the four intensity bins are accessed and matched with the models for associated with the respective bins and scaling types at 1106.

In some embodiments, the matching can comprise estimation of distances between the models associated with the bins and the respective key-frames. For example, the distance between a key-frame and a model can be the average distance of the set of feature pairs (P) with minimum L2 distance found by crosschecked brute-forcing key-frame SURFs ($S_k$) and model SURFs ($S_m$). The model with the lowest average distance is selected at 1108 as the best match for the key-frame associated with the bin. At 1110, the model predictions associated with all the bins are combined by simple voting. At 1112, it is determined if a model received more votes than a vote percentage threshold. If yes, then such a model is identified as the target at 1114, else the process terminates. In some embodiments, the user may be prompted to retry.

Figure 12:
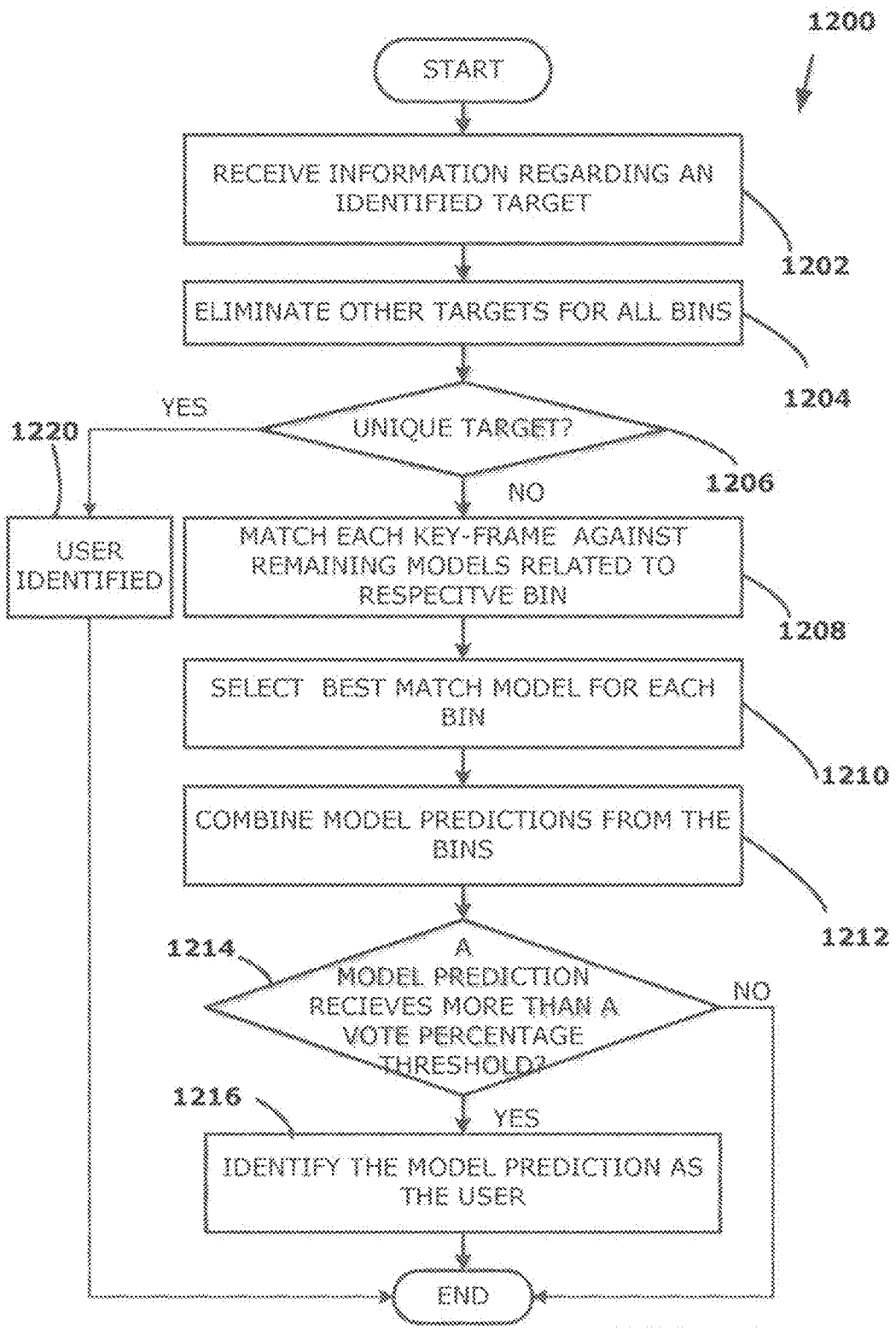
FIG. 12 is a flowchart that details a methodology of identifying a user based on the identified target information in accordance with some embodiments.

FIG. 12 is a flowchart 1200 that details a methodology of identifying a user based on the identified target information in accordance with some embodiments. The method begins at 1202 wherein information regarding an identified target is received. The target can be one or more of a user's body part and a conductive object. At 1204, models identifying targets other than the identified target are eliminated. For example, if a target is identified as a fist of a user, then the models associated with other body-parts or conductive objects can be dropped from consideration. Accordingly, a user can employ a unique target such as, for example a uniquely shaped pendant, for identification and/or authorization so that no other user known to the mobile device 106 employs a similar target. In this instance, a determination at 1206 regarding the uniqueness of the target will output a positive result so that there is a one-to-one correspondence between the identified object and the user. The user is therefore immediately identified without further processing as shown at 1220 and the process is terminated. It may be appreciated that when conductive objects such as symmetric pendants are employed for authentication, they can generally be associated with a single profile if the authentication is to be based only on the target feature data. In some embodiments, symmetric conductive targets can be associated with other authentication modalities such as passwords in order to identify two users uniquely. Asymmetric targets however, can be associated with multiple profiles based on the various ways in which they can be oriented in a two-dimensional plane.

However, if the determination at 1206 is negative, it can be deduced that multiple users employed similar targets such as the same body-parts and hence further processing is needed for identifying a unique combination of the user and target. The method proceeds to 1208 wherein the key-frames are matched against the subset of the models 222 that remain associated with each of the respective bins. In some embodiments, each SURF of a key-frame is matched against the SURF sets in the model (using L2 distance) to find the two best match pairs, per set and the best pair is considered well-matched, if and only if its matching distance is less than 70% of the pair's distance. Then, for each set in the model, the homo-graphic projection between it and the key frame are found using the well-matched pairs. If the projection is scaled or perspective corrected, the set in the model is considered a mismatch for the key-frame. Finally, a model of a given scaling type is considered for competing for a key-frame of respective type if and only if less than a set-match percentage threshold of the sets in the model are mismatched. The matching closeness of the entire model to the key-frame is the sum of the inverted distances of well-matched pairs.

The best matching models associated with each of the bins and respective scaling types that represent a prediction of the user's identity based on the data from the respective bin is selected at 1210. Accordingly, twelve predictions for user identification are obtained at 1210. The multiple predictions are combined at 1212 and it is determined at 1214 if a prediction received more than a vote percentage threshold of the vote. If yes, then a user associated with such a model that received more than a vote percentage threshold is identified and/or authenticated at 1216.

Figure 13:
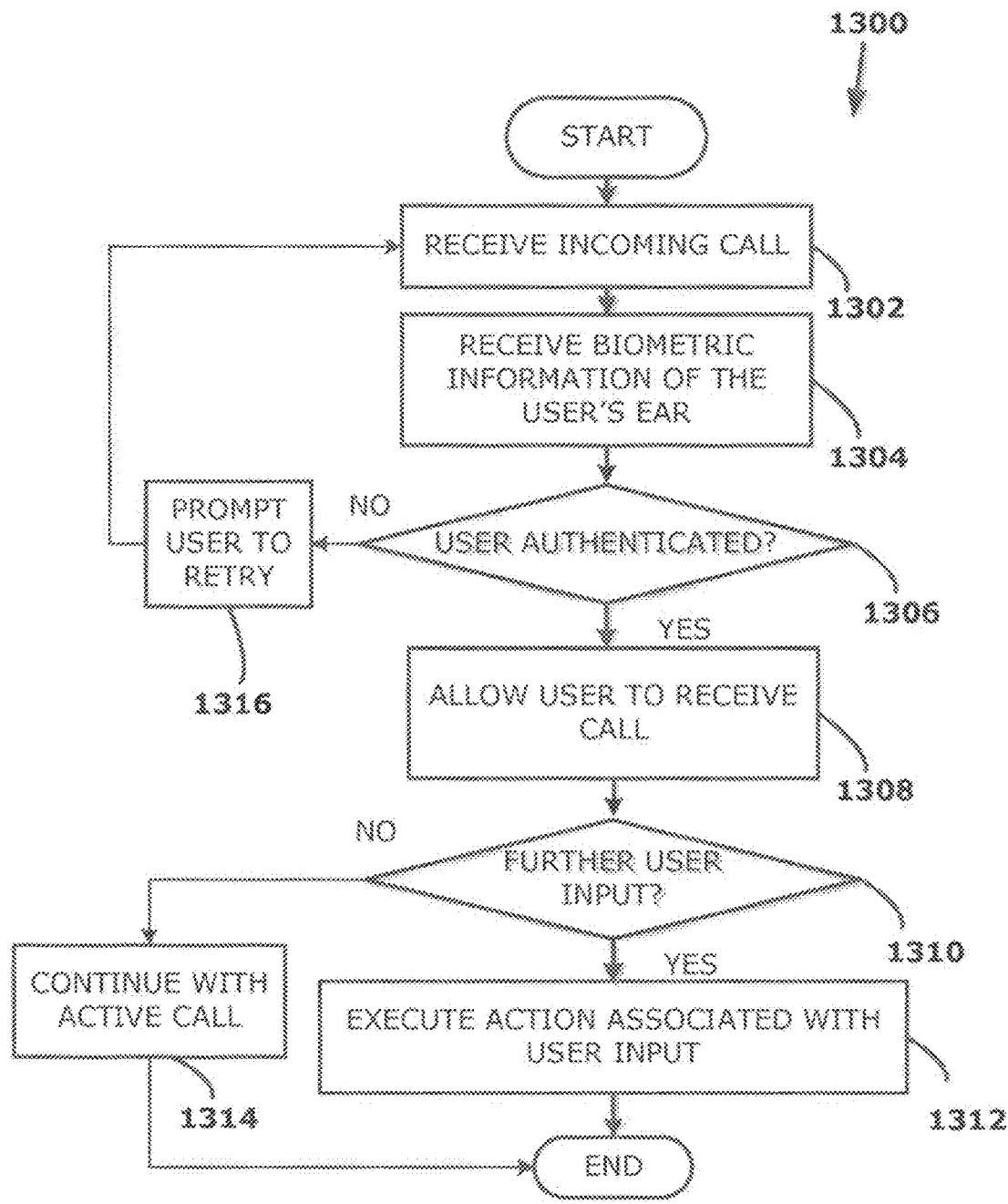
FIG. 13 is a flowchart that details a use case scenario of call interaction technique and seamless authentication during a call in accordance with some embodiments.

FIG. 13 is a flowchart 1300 that details a use case scenario of call interaction technique and seamless authentication during a call in accordance with some embodiments. The method begins at 1302 wherein the user 102 receives a call on the mobile device 106. At this point the user 102 does not need to execute a separate action, such as pressing a button to receive the call. Instead the user 102 simply presses the touchscreen 328 of the mobile device 106 against his ear and the biometric information of the user's ear 104 is obtained at 1304. At 1306, it is determined by the biometric authentication module 100 operating on the mobile device 106 if the user is authenticated to receive the call in accordance with embodiments described herein.

If the user cannot be authenticated, the user can be prompted to retry at 1316. If the user is authenticated at 1306, the user 102 is allowed to receive the call at 1308. In this case, the mobile device 106 recognizes the presence of an ear to take the call. The ear can be detected as differentiated from a handheld grip of the mobile device 106 so that the manual input is eliminated from this step. In some embodiments, further user input can be received during an active call. A user can employ various interactions with the mobile device 106 to execute tasks during a call. For example, the user 102 can slide the mobile device 106 upwards and press the touchscreen 328 to his ear 104 so that the user 102 can be verified based on the unique features of his ear. This is useful for example, on a telephone hotline dealing with lost-password calls. Another common mid-call action is to switch to the speakerphone mode. Another gesture, for example, the user 102 holding the mobile device 106 in a palm-down grip with his hand over the phone can be used to recognize the features of the grip in the context of an ongoing call to activate speakerphone mode on the mobile device 106. If further input is thus received at 1310 during the call, the action associated with the received input is executed at 1312. Else, the active, ongoing call is allowed to continue at 1314.

It may be appreciated that the gestures for providing the user input during an active call are described only by the way of illustrated and are not limiting. Various gestures can be executed using different targets to carry out numerous tasks during a call, such as, receiving another call, conferencing the other call with a currently active call, or dialing another number while keeping the currently active call on hold and similar functionality can have various gestures associated therewith for ease of use.

Figure 14:
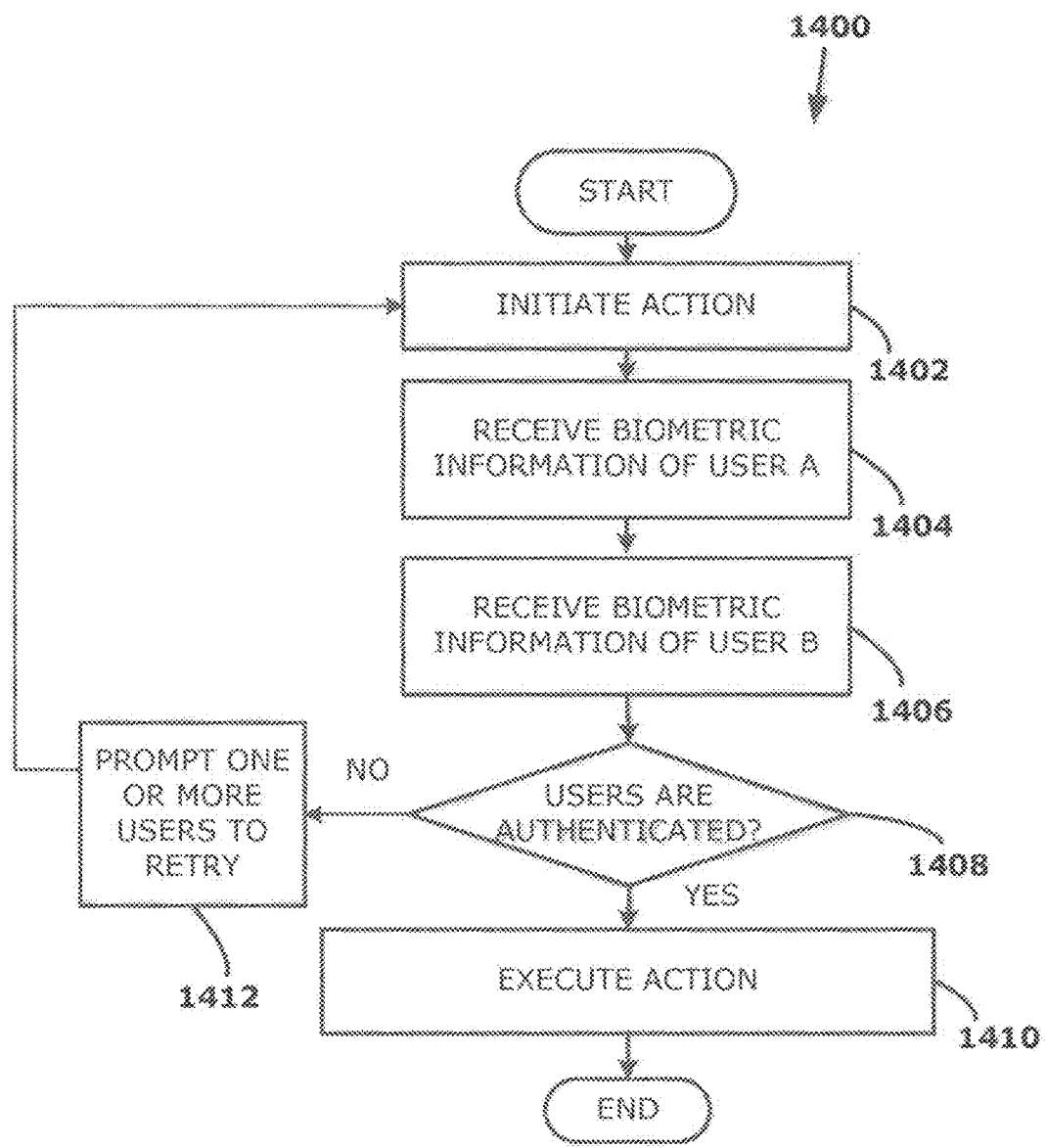
FIG. 14 is a flowchart that details a handshake methodology for executing tasks such as document signing or initiating file transfer in accordance with some embodiments.

FIG. 14 is a flowchart 1400 that details a handshake methodology for executing tasks such as document signing or initiating file transfer in accordance with some embodiments. The method begins at 1402 with initiating the desired action. In the case of document signing, the initiating action can comprise encrypting a file comprising one or more of audio, video or text data, editing an encrypted file or document or opening an encrypted file. User A's biometric information or feature data of a target is obtained at 1404 while user B's biometric information or feature data of a target (which may or may not be the same as User A's target) is obtained at 1406. Although the steps 1404 and 1406 are shown sequentially, it may be appreciated that the biometric information or target data of a plurality of users needed for document signing can be obtained simultaneously. For example, User A and User B can both be gripping the mobile device 106 at the same time while the biometric authentication module 100 within the mobile device 106 receives frames of capacitive sensor data for both the users. In some embodiments, the each of the two users can grip or touch the mobile device 106 differently so that the mobile device 106 is able to differentiate User A and User B based on one or more of their biometric features and their gestures. In some embodiments, each of User A and User B may grip the mobile device 106 in a similar manner so that they are differentiated only on their biometric feature data. At 1408, it is determined if both users are authenticated. If the authentication fails, then one or more of the users can be requested to retry at 1412. If both the users are authenticated at 1408 the desired action such as encrypting, opening or editing a file is executed at 1410.

In some embodiments, the users A and B may desire to exchange data or information via short distance wireless communication networks such as Bluetooth networks or NFC (Near Field Communication) using their respective mobile devices. In this case, the desired action can be initiated at 1402 by the users A and B wherein they provide input to connect their mobile devices to each other via a communication network and shaking their respective devices simultaneously. In some embodiments, User A and User B can grip their respective mobile devices in a predetermined manner so that they may be authenticated or authorized for the data exchange. Subsequent simultaneous shaking action signals their devices to exchange information. In this case, the biometric data of User A and User B can be received by their respective devices at the same time. Accordingly, steps 1404 and 1406 can be executed simultaneously. If the users are both authenticated by their respective mobile devices at 1408, then the data exchange occurs at 1410 or else users A and B may be prompted to retry at 1412. This feature is very useful to exchange data between such as when two remote parties shake their devices simultaneously. The handshake serves as a document signature in some embodiments. It may be appreciated that interaction between two users is detailed only for illustration purposes and that any number of users and gestures can be used for data transmission For example, User A can be connected with more than two users and may transmit data simultaneously to all the user by executing the procedure detailed herein. Furthermore, biometric feature data from any number of users with targets comprising one or more of body parts and conductive objects can be used for encryption/decryption and data exchange purposes.

Figure 15:
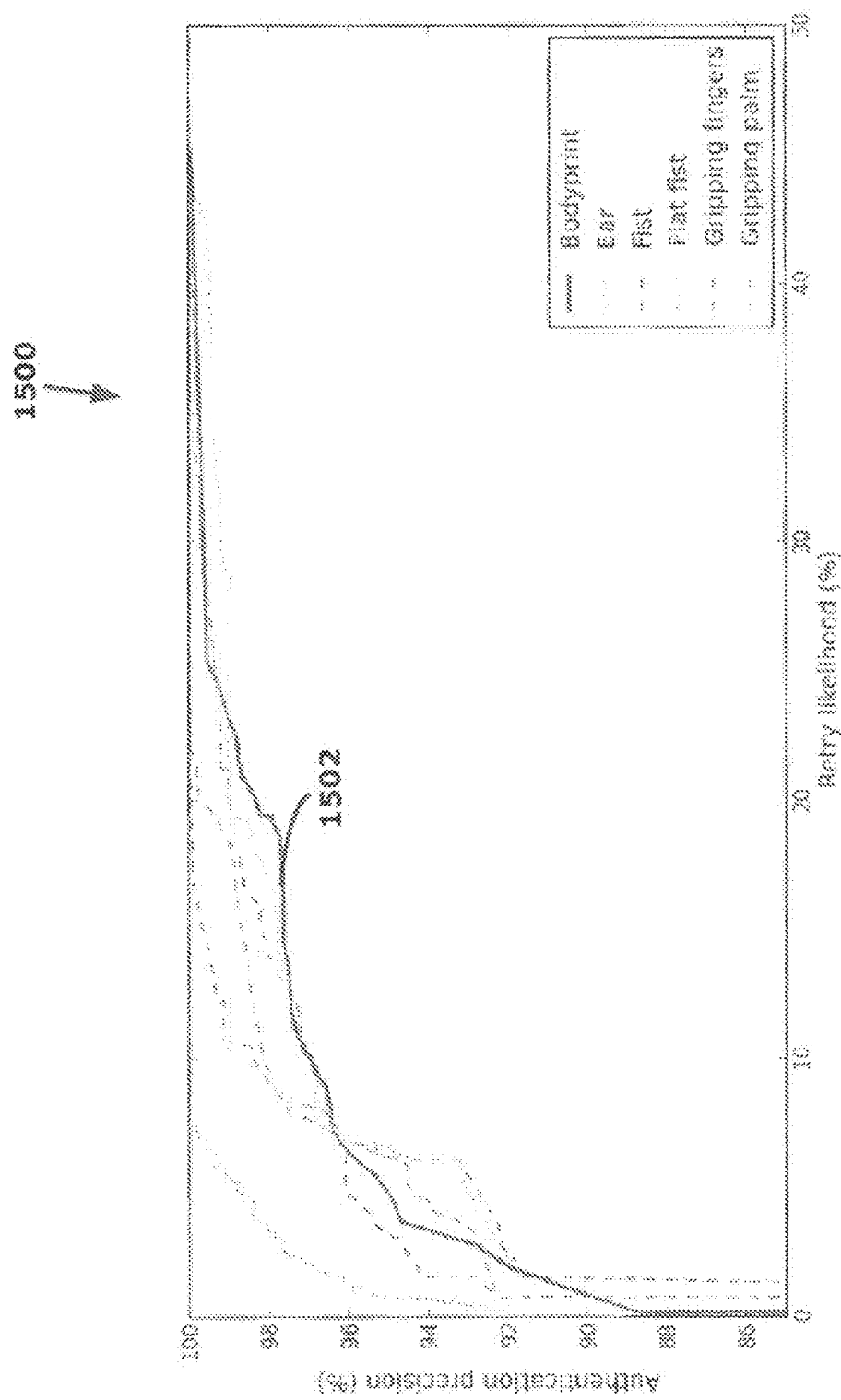
FIG. 15 is an illustration that shows authentication precision versus retry likelihood of the biometric authentication module.

FIG. 15 is a graph 1500 that shows evaluation data for the biometric authentication module 100 implemented in accordance with embodiments described herein. In the experiments, six body-parts were valuated. The evaluation data was collected over multiple sessions from 12 participants with 12 data captures per-user for each body-part amounting to a total of 864 samples.

The biometric authentication module 100 was tested with 12-fold cross validation. In each fold of the evaluation one user was labeled as unknown user and all of that user's data was withheld from the training data set. For each of the other users, 11 of their images per body-part were added to the training dataset. The trained biometric authentication module 100 was then tested, per body-part, with 11 cases of known users and one case of an unknown user. The biometric authentication module 100 attempts to identify a known user or rejects the user when it determines that the user is not known. The cross-validation was repeated varying the three tune-able thresholds.

In the results, a known user being correctly identified is a true-positive; a false positive is a known user being incorrectly identified or an unknown user being accepted, a true-negative is an unknown user being rejection, a known user being rejected is a false negative. The primary curve 1502 in the graph 1500 shows authentication precision versus retry rate of the biometric identification module 100 as calculated from the evaluation. The retry rate represents the likelihood of a known user being prompted to retry. The authentication precision represents the likelihood of a known user being correctly identified and unknown users being rejected. Each of the other curves in the figure are for when the biometric authentication module allows only one body-part for user identification.

From the evaluation results across all the six body-parts, it is clear that the biometric authentication module 100 can be tuned for high identification precision (99.59% with retry likelihood of 26.86%) for application such as handshaking to unlock documents. The biometric authentication module 100 can be tuned to reduce know user retry likelihood for applications, such as fist-bumped messaging, that require less rigorous user identification (86.91% identification precision at a rejection likelihood of 0.16%). The biometric authentication module 100 thus improves the functioning of a computing device by enabling it with greater security without compromising convenience. It is a cost-effective improvement as it can be readily incorporated into existing devices that include a touchscreen without requiring expensive hardware like fingerprint scanners while at the same time providing security features that are normally associated with such expensive hardware.

Figure 16:
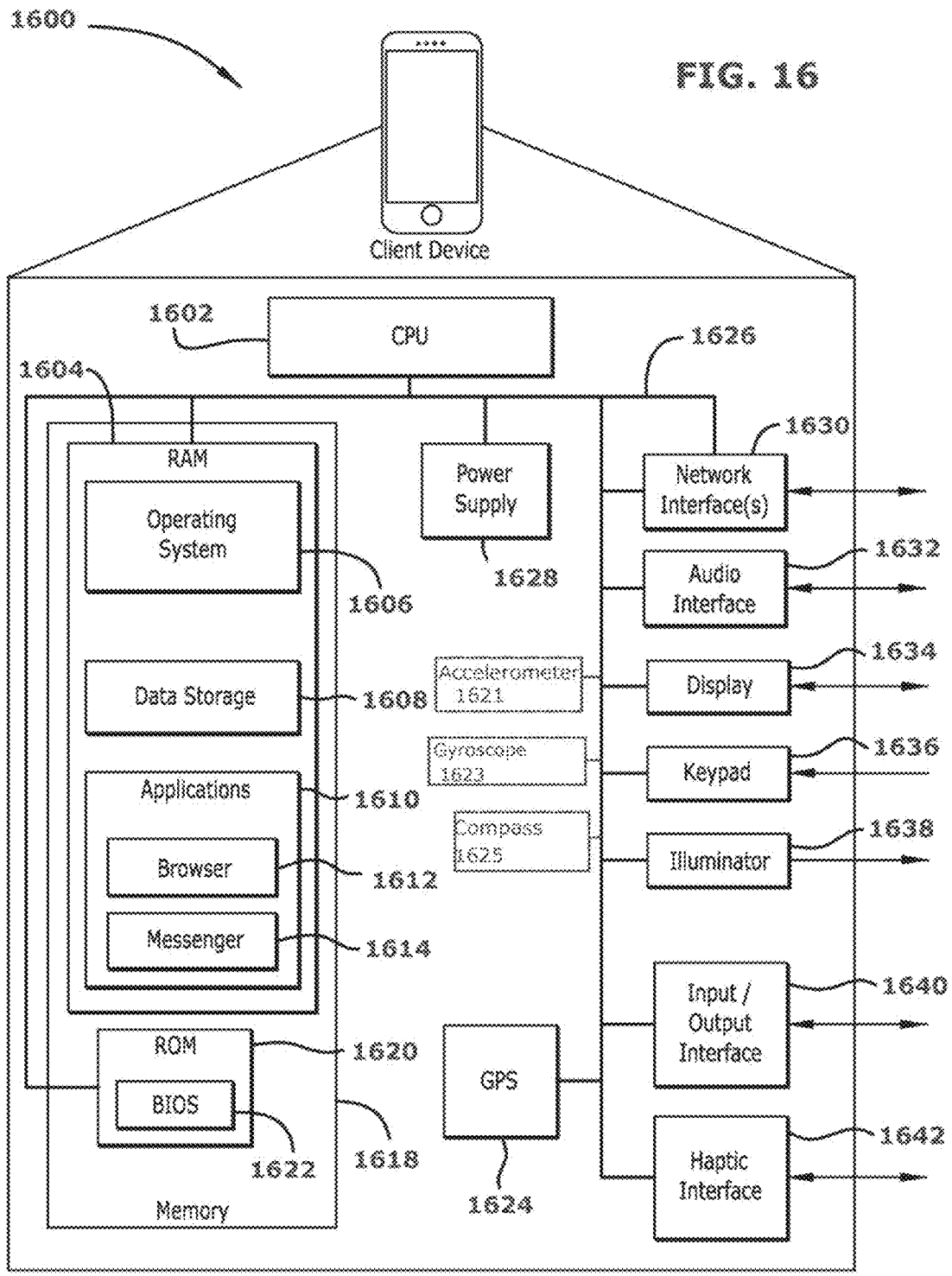
FIG. 16 is a schematic diagram illustrating a client device implementation of a computing device in accordance with embodiments of the present disclosure.

FIG. 16 is a schematic diagram 1600 illustrating a client device implementation of a computing device 106 in accordance with embodiments of the present disclosure. For example, the client device 1600 can comprise the biometric authentication module 100 that executes user identification and/or authentication in accordance with embodiments described herein. The client device 1600 may include a computing device capable of sending or receiving signals, such as via a wired or a wireless network, and capable of running application software or "apps" 1610. A client device 1600 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The client device 1600 can vary in terms of capabilities or features. The client device 1600 can include standard components such as a CPU 1602, power supply 1628, a memory 1618, ROM 1620, BIOS 1622, network interface(s) 1630, audio interface 1632, display 1634, keypad 1636, illuminator 1638, I/O interface 1640 interconnected via circuitry 1626. Claimed subject matter is intended to cover a wide range of potential variations. For example, the keypad 1636 of a cell phone may include a numeric keypad or a display 1634 of limited functionality, such as a monochrome liquid crystal display (LCD) for displaying text. In contrast, however, as another example, a web-enabled client device 1600 may include one or more physical or virtual keyboards 1636, mass storage, one or more accelerometers 1621, one or more gyroscopes 1623 and a compass 1625 global positioning system (GPS) 1624 or other location identifying type capability, Haptic interface 1642, or a display with a high degree of functionality, such as a touch-sensitive color 2D or 3D display, for example. The memory 1618 can include Random Access Memory 1604 including an area for data storage 1608.

The client device 1600 may include or may execute a variety of operating systems 1606, including a personal computer operating system, such as a Windows, iOS or Linux. or a mobile operating system, such as iOS, Android, or Windows Mobile, or the like. A client device 1600 may include or may execute a variety of possible applications 1610, such as a client software application 1614 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1600 may also include or execute an application to communicate content, such as, for example, textual content, multimedia content, or the like. A client device 1600 may also include or execute an application to perform a variety of possible tasks, such as browsing 1612, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more additional mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, at a first computing device, input provided by a user to connect to at least one disparate second computing device via a communication network;
identifying, via the first computing device, a second computing device on the communication network;
connecting, by the first computing device, to the second computing device via the communication network;
identifying, via the first computing device, a target associated with a touchscreen associated with the first computing device, said target comprising information associated with a body-part of the user;
determining, by the first computing device, based on the identified target, feature data of the target, said feature data comprising biometric information of the body-part;
analyzing, via the first computing device, said feature data;
determining, via the first computing device, that an electronic information exchange is authorized with said second computing device based on the feature data analysis;
receiving, by the first computing device, information associated with a second input, said second input being resultant of a shaking motion performed by the first computing device, said second input information comprising data indicating said shaking motion of the first computing device; and
executing, by the first computing device, said electronic information exchange based on said determined authorization and said second input, said information exchange comprises transmitting an electronic document encrypted with the biometric information of the user's body part to the second computing device.

2. The method of claim 1, wherein said information exchange further comprises the first computing device
receiving an electronic document from the second computing device.

3. A first computing device comprising:
a touchscreen;
a processor; and
a processor-readable non-transitory storage medium comprising programming logic, the programming logic comprising:
logic executed by the processor for receiving, at the first computing device, input provided by a user to connect to at least one disparate second computing device via a communication network;
logic executed by the processor for identifying, via the first computing device, a second computing device on the communication network;
logic executed by the processor for connecting, by the first computing device, to the second computing device via the communication network;
logic executed by the processor for identifying, via the first computing device, a target associated with the touchscreen, said target comprising information associated with a body-part of the user;
logic executed by the processor for determining, by the first computing device, based on the identified target, feature data of the target, said feature data comprising biometric information of the body-part;
logic executed by the processor for analyzing, via the first computing device, said feature data;
logic executed by the processor for determining, via the first computing device, that an electronic information exchange is authorized with said second computing device based on the feature data analysis;
logic executed by the processor for receiving, by the first computing device, information associated with a second input, said second input being resultant of a shaking motion performed by the first computing device, said second input information comprising data indicating said shaking motion of the first computing device; and
logic executed by the processor for executing, by the first computing device, said electronic information exchange based on said determined authorization and said second input, said information exchange comprises transmitting an electronic document encrypted with the biometric information of the user's body part to the second computing device.

4. A non-transitory computer-readable storage medium tangibly encoded with computer-executable instructions, that when executed by a first computing device, performs a method comprising:
receiving, at the first computing device, input provided by a user to connect to at least one disparate second computing device via a communication network;
identifying, via the first computing device, a second computing device on the communication network;
connecting, by the first computing device, to the second computing device via the communication network;
identifying, via the first computing device, a target associated with a touchscreen associated with the first computing device, said target comprising information associated with a body-part of the user;
determining, by the first computing device, based on the identified target, feature data of the target, said feature data comprising biometric information of the body-part;
analyzing, via the first computing device, said feature data;
determining, via the first computing device, that an electronic information exchange is authorized with said second computing device based on the feature data analysis;
receiving, by the first computing device, information associated with a second input, said second input being resultant of a shaking motion performed by the first computing device, said second input information comprising data indicating said shaking motion of the first computing device; and
executing, by the first computing device, said electronic information exchange based on said determined authorization and said second input, said information exchange comprises transmitting an electronic document encrypted with the biometric information of the user's body part to the second computing device.

* * * * *